(12) United States Patent
Sheng et al.

(10) Patent No.: US 10,893,379 B2
(45) Date of Patent: Jan. 12, 2021

(54) SYSTEM AND METHOD FOR DETERMINING WHETHER AN OBJECT BELONGS TO A TARGET GEO-FENCE

(71) Applicant: BEIJING DIDI INFINITY TECHNOLOGY AND DEVELOPMENT CO., LTD., Beijing (CN)

(72) Inventors: Kehua Sheng, Tianjin (CN); Zhen Zhang, Beijing (CN); Yue Wang, Beijing (CN); Taixu Jiang, Beijing (CN); Quancheng Rao, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/901,043

(22) Filed: Jun. 15, 2020

(65) Prior Publication Data

US 2020/0314589 A1    Oct. 1, 2020

Related U.S. Application Data

(63) Continuation of application No. PCT/CN2018/118661, filed on Nov. 30, 2018.

(30) Foreign Application Priority Data

Nov. 28, 2018  (CN) .......................... 2018 1 1435008

(51) Int. Cl.
*H04W 4/02*     (2018.01)
*H04W 4/021*    (2018.01)
(Continued)

(52) U.S. Cl.
CPC ............ *H04W 4/022* (2013.01); *G06F 16/29* (2019.01); *H04W 4/029* (2018.02); *H04W 4/35* (2018.02)

(58) Field of Classification Search
CPC ......... G06F 16/29; H04W 4/35; H04W 4/029; H04W 4/022
See application file for complete search history.

(56) References Cited

U.S. PATENT DOCUMENTS

2010/0094500 A1   4/2010  Jin
2015/0264523 A1   9/2015  Xu et al.
(Continued)

FOREIGN PATENT DOCUMENTS

CN   103106807 A   5/2013
CN   103810194 A   5/2014
(Continued)

OTHER PUBLICATIONS

International Search Report in PCT/CN2018/118661 dated Aug. 28, 2019, 4 pages.
(Continued)

*Primary Examiner* — Dai Phuong
(74) *Attorney, Agent, or Firm* — Metis IP LLC

(57) ABSTRACT

Systems and methods for determining whether an object belongs to a target geo-fence are provided. The method may include: obtaining geographic coordinates corresponding to a geographic location of the object; determining information of a grid corresponding to the geographic coordinates; indexing the grid, based on the information of the grid, in a first grid database. The object may not belong to the target geo-fence if the indexed grid is not in the first grid database. The method may further include indexing the grid, based on the information of the grid, in a second grid database if the indexed grid is in the first grid database. The object may (Continued)

belong to the target geo-fence if the indexed grid is not in the second grid database. The method may further include determining whether the object belongs to the target geo-fence based on a relationship of the object and a local geo-fence if the indexed grid is in the second grid database.

20 Claims, 13 Drawing Sheets

(51) Int. Cl.
    *G06F 16/29* (2019.01)
    *H04W 4/35* (2018.01)
    *H04W 4/029* (2018.01)

(56) References Cited

U.S. PATENT DOCUMENTS

| | | | | |
|---|---|---|---|---|
| 2015/0350351 A1* | 12/2015 | Tung | ................ | H04W 4/21 |
| | | | | 709/204 |
| 2016/0377438 A1* | 12/2016 | Kim | ................ | H04W 4/021 |
| | | | | 702/150 |
| 2017/0192981 A1 | 7/2017 | Glover et al. | | |
| 2019/0340876 A1* | 11/2019 | Northrup | ................ | H04L 63/08 |
| 2020/0037102 A1* | 1/2020 | Zhang | ................ | G06F 16/2272 |
| 2020/0145782 A1* | 5/2020 | Stirling | ................ | H04W 4/021 |

FOREIGN PATENT DOCUMENTS

| | | |
|---|---|---|
| CN | 104063509 A | 9/2014 |
| CN | 104918327 A | 9/2015 |
| CN | 105828292 A | 8/2016 |
| CN | 105893384 A | 8/2016 |
| CN | 105959913 A | 9/2016 |
| CN | 108388621 A | 8/2018 |
| CN | 108846882 A | 11/2018 |
| WO | 2019232702 A1 | 12/2019 |

OTHER PUBLICATIONS

Written Opinion in PCT/CN2018/118661 dated Aug. 28, 2019, 4 pages.

First Office Action in Chinese Application No. 201811435008.5 dated Nov. 2, 2020, 28 pages.

* cited by examiner

900

SYSTEM AND METHOD FOR DETERMINING WHETHER AN OBJECT BELONGS TO A TARGET GEO-FENCE

CROSS-REFERENCE TO RELATED APPLICATIONS

This application is a continuation of International Application NO. PCT/CN2018/118661, filed on Nov. 30, 2018, which claims priority of Chinese Patent Application No. 201811435008.5, filed on Nov. 28, 2018, the entire contents of each of which are hereby incorporated by reference.

TECHNICAL FIELD

The present disclosure generally relates to on-demand services, and in particular, relates to systems and methods for determining whether an object belongs to a target geo-fence.

BACKGROUND

With the development of Internet technology, on-demand services, such as online taxi hailing services and delivery services, are starting to play a significant role in people's daily lives. Refined management of an on-demand service platform may improve an enterprise profit. For example, for different service areas, the on-demand service platform may make corresponding marketing policy for service providers and/or service requesters which are registered in the on-demand service platform. As another example, for different service areas, the on-demand service platform may make corresponding scheduling policy to satisfy a service capacity requirement. Such refined management of the on-demand services relies on accurate acquisition of location information of the users, for example, acquisition of a geo-fence where the users belong to. Thus, it is desirable to develop effective systems and methods for determining accurately whether an object belongs to a target geo-fence.

SUMMARY

According to an aspect of the present disclosure, a system for determining whether an object belongs to a target geo-fence is provided. The system may include at least one storage device including one or more sets of instructions, and at least one processor in communication with the at least one storage device. When executing the set of instructions, the at least one processor may obtain geographic coordinates corresponding to a geographic location of the object. The at least one processor may determine information of a grid corresponding to the geographic coordinates. The at least one processor may index the grid, based on the information of the grid, in a first grid database. In response to a first negative result that the indexed grid is not in the first grid database, the at least one processor may determine that the object does not belong to the target geo-fence. In response to a first positive result that the indexed grid is in the first grid database, the at least one processor may index the grid, based on the information of the grid, in a second grid database. In response to a second negative result that the indexed grid is not in the second grid database, the at least one processor may determine that the object belongs to the target geo-fence. In response to a second positive result that the indexed grid is in the grid database, the at least one processor may determine whether the object belongs to the target geo-fence based on a relationship of the object and a local geo-fence. The local geo-fence may be a region that the border grid overlaps with the target geo-fence.

In some embodiments, the at least one processor may establish the first grid database. The at least one processor may obtain the target geo-fence. The at least one processor may obtain a plurality of grids corresponding to the target geo-fence. Each of the plurality of grids may include a polygon having a plurality of vertexes. The at least one processor may encode data corresponding to the plurality of grids into a first data structure. The first data structure may include identifiers of the plurality of grids and coordinates of the plurality of vertexes. The at least one processor may write the encoded data in at least one non-transitory storage medium.

In some embodiments, the at least one processor may establish the second grid database. The at least one processor may obtain the one or more border grids from the plurality of grids. The at least one processor may determine one or more local geo-fences based on the one or more border grids and the target geo-fence. The at least one processor may encode data corresponding to the one or more border grids and the one or more local geo-fences into a second data structure. The second data structure may include identifiers of the one or more border grids, identifiers of the one or more local geo-fences, coordinates of vertexes of each of the one or more border grids, and coordinates of vertexes of each of the one or more local geo-fences, wherein the vertexes of each of the one or more local geo-fences include one or more intersection points of the border grid and the local geo-fence. The at least one processor may write the encoded data in the at least one non-transitory storage medium.

In some embodiments, for each of the one or more border grids, the at least one processor may determine a first linked list corresponding to the border grid and a second linked list corresponding to the target geo-fence respectively. Each node of either the first linked list or the second linked list may correspond to one vertex of the vertexes of the border grid or one vertex of the vertexes of the target geo-fence respectively. The at least one processor may determine the one or more of intersection points of the border grid and the target geo-fence. The at least one processor may update the first linked list and the second linked list based on the one or more intersection points. The at least one processor may determine the one or more local geo-fences based on the updated first linked list and the updated second linked list.

In some embodiments, for determining each of the one or more local geo-fences, the at least one processor may traverse the updated first linked list and the updated second linked list based on a predetermined traverse rule. The at least one processor may determine an intersection set of the border grid and the target geo-fence. The intersection set may include the one or more intersection points of the border grid and the target geo-fence. The at least one processor may determine the local geo-fence based on the intersection set.

In some embodiments, the predetermined traverse rule may be associated with a starting point of the traverse, and a traverse sequence or a traverse switching order. The starting point of the traverse may include the vertex of the border grid that is outside of the target geo-fence or the vertex of the target geo-fence that is outside of the border grid. The traverse sequence may include a clockwise or a counterclockwise. The traverse switching order may include alternate traversing the updated first linked list and the updated second linked list every time encountering an intersection point, excluding a first intersection point encountered.

In some embodiments, the first linked list and the second linked list may be circular doubly linked lists.

In some embodiments, the at least one processor may determine that the object belongs to the local geo-fence if a ray, whose endpoint is the object, crosses an odd number of borders of the local geo-fence. The at least one processor may determine that the object does not belong to the local geo-fence if the ray, whose endpoint is the object, crosses an even number of borders of the local geo-fence.

In some embodiments, the at least one processor may determine a winding number associated with the object and the local geo-fence. The at least one processor may determine that the object belongs to the local geo-fence if the winding number is unequal to zero. The at least one processor may determine that the object does not belong to the local geo-fence if the winding number is equal to zero.

In some embodiments, the grid may have a shape of a regular hexagon.

According to an aspect of the present disclosure, a method for determining whether an object belongs to a target geo-fence is provided. The method may be implemented on a computing device having at least one processor and at least one computer-readable storage medium. The at least one processor may obtain geographic coordinates corresponding to a geographic location of the object. The at least one processor may determine information of a grid corresponding to the geographic coordinates. The at least one processor may index the grid, based on the information of the grid, in a first grid database. In response to a first negative result that the indexed grid is not in the first grid database, the at least one processor may determine that the object does not belong to the target geo-fence. In response to a first positive result that the indexed grid is in the first grid database, the at least one processor may index the grid, based on the information of the grid, in a second grid database. In response to a second negative result that the indexed grid is not in the second grid database, the at least one processor may determine that the object belongs to the target geo-fence. In response to a second positive result that the indexed grid is in the grid database, the at least one processor may determine whether the object belongs to the target geo-fence based on a relationship of the object and a local geo-fence. The local geo-fence may be a region that the border grid overlaps with the target geo-fence.

According to another aspect of the present disclosure, a non-transitory computer readable medium is provided. The non-transitory computer readable medium may comprise at least one set of instructions for determining whether an object belongs to a target geo-fence. When executing the set of instructions, at least one processor may obtain geographic coordinates corresponding to a geographic location of the object. The at least one processor may determine information of a grid corresponding to the geographic coordinates. The at least one processor may index the grid, based on the information of the grid, in a first grid database. In response to a first negative result that the indexed grid is not in the first grid database, the at least one processor may determine that the object does not belong to the target geo-fence. In response to a first positive result that the indexed grid is in the first grid database, the at least one processor may index the grid, based on the information of the grid, in a second grid database. In response to a second negative result that the indexed grid is not in the second grid database, the at least one processor may determine that the object belongs to the target geo-fence. In response to a second positive result that the indexed grid is in the grid database, the at least one processor may determine whether the object belongs to the target geo-fence based on a relationship of the object and a local geo-fence. The local geo-fence may be a region that the border grid overlaps with the target geo-fence.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

It will be understood that the term "system," "module," and/or "block" used herein are one method to distinguish different components, elements, parts, section or assembly of different level in ascending order. However, the terms may be displaced by another expression if they achieve the same purpose.

Figure 3:
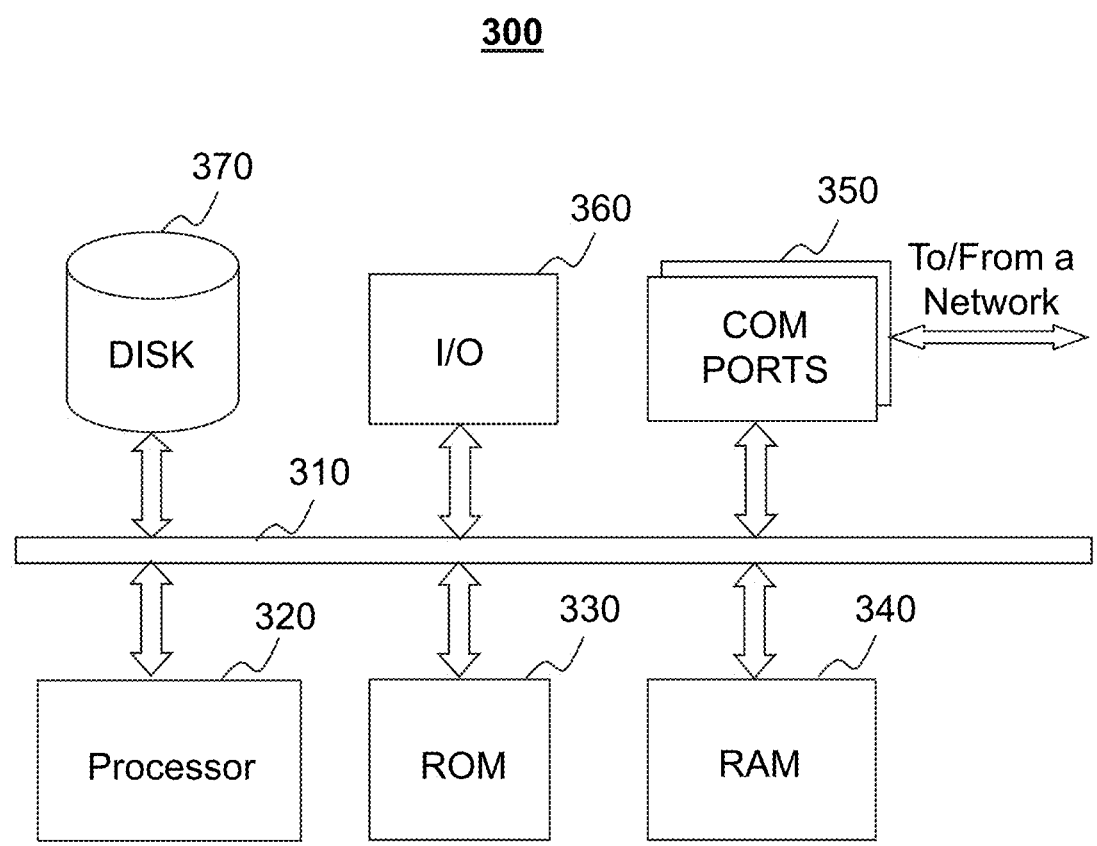
FIG. 3 is a block diagram illustrating an exemplary computing device according to some embodiments of the present disclosure.

The term "module," or "block," as used herein, refers to logic embodied in hardware or firmware, or to a collection of software instructions. A module or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices (e.g., the processor 320 as illustrated in FIG. 3) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an Electrically Programmable Read-Only-Memory (EPROM). It will be further appreciated that hardware modules/units/blocks may be included in connected logic components, such as gates and flip-flops, and/or can be included in programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may apply to a system, an engine, or a portion thereof.

It will be understood that when a module or block is referred to as being "connected to," or "coupled to," another module, or block, it may be directly connected or coupled to, or communicate with the other module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, the system or method of the present disclosure may be applied to any other kind of online on-demand service. For example, the system or method of the present disclosure may be applied to different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, a bicycle, a tricycle, a motorcycle, or the like, or any combination thereof. The system or method of the present disclosure may be applied to taxi hailing, chauffeur services, delivery service, carpool, bus service, take-out service, driver hiring, vehicle hiring, bicycle sharing service, train service, subway service, shuttle services, location service, or the like. As another example, the system or method of the present disclosure may be applied to shopping service, learning service, fitness service, financial service, social service, or the like. The application scenarios of the system or method of the present disclosure may include a web page, a plug-in of a browser, a client terminal, a custom system, an internal analysis system, an artificial intelligence robot, or the like, or any combination thereof.

The object of the on-demand service may be any product. In some embodiments, the product may be a tangible product or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

The term "user" in the present disclosure may refer to an individual, an entity, or a tool that may request a service, order a service, provide a service, or facilitate the providing of the service. In the present disclosure, terms "user" and "user terminal" may be used interchangeably.

In an aspect, the present disclosure is directed to systems and methods for efficiently determining whether an object belongs to a target geo-fence. For example, the system may construct a discrete global grid system (DGGS) for modeling the earth's surface. In the DGGS, the earth's surface may be divided to a plurality of grids. The system may determine an identifier of grid (also referred to herein as a grid ID) corresponding to geographic coordinates of the object. In some embodiments, the system may index the grid ID in a first grid database. If the grid ID is not indexed in the first grid database, the object may not belong to the target geo-fence. If the grid ID is indexed in the first grid database, the system may further index the grid ID in a second grid database. If the grid ID is not indexed in the second grid database, the object may belong to the target geo-fence. If the grid ID is indexed in the second grid database, the system may further need to determine whether the object belongs to the target geo-fence based on a relationship of the object and a local geo-fence. For example, the system may determine the relationship of the object and a local geo-fence based on a ray casting algorithm. The present disclosure enhances the efficiency of conventional computing, e.g., a ray casting algorithm, by reducing the amount of computing, when determining whether an object belongs to a target geo-fence. For example, the target geo-fence is divided to one or more interior grids and one or more border grids. Assuming that the target geo-fence has a shape of n polygon, and includes m border grids. In some embodiments, if the object is in one interior grid, the computation complexity may be equal to o(1). In some embodiments, if the object is in one border grid, the computation complexity may be equal to o(n/m). In some embodiments, if the object is not in the target geo-fence, that is, the object is neither in the interior grid nor in the border grid, the computation complexity may be equal to o(1). In some embodiments, the computation complexity of the conventional ray casting algorithm may be equal to o(n).

Taking an example of the on-demand transportation service (e.g., a car-hailing service), the system may be used to determine the geo-fence where a service requester and/or a service provider belongs to at a certain moment. In some embodiments, the system may make the marketing policy corresponding to the geo-fence. In some embodiments, the system may make the security policy corresponding to the geo-fence. In some embodiments, the system may determine a service capacity of the geo-fence, and make the scheduling policy based on the service capacity.

Figure 1:
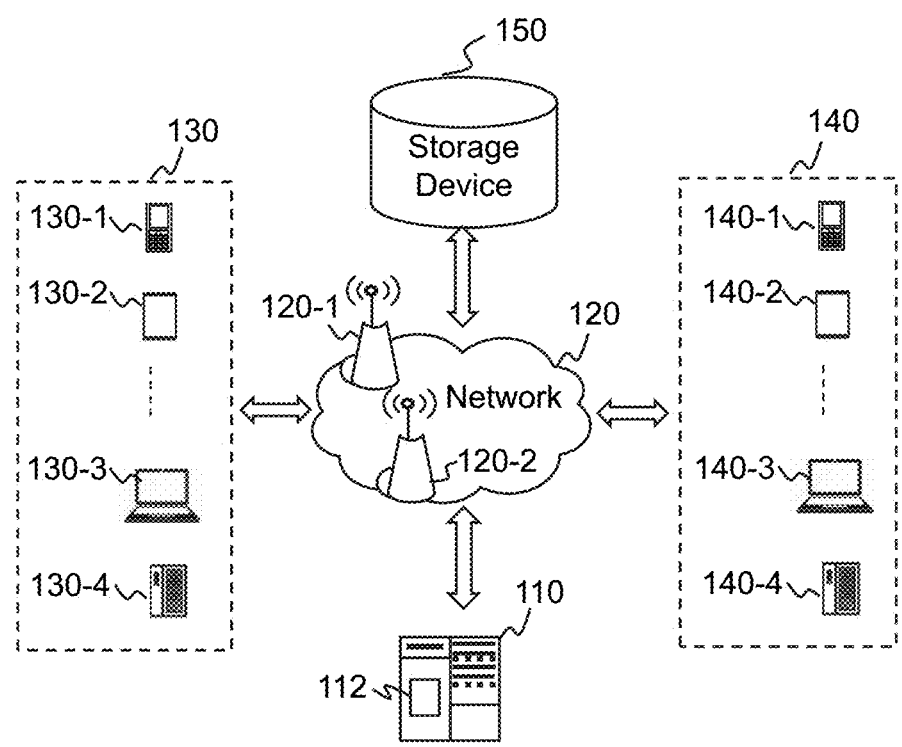
FIG. 1 is a schematic diagram illustrating an exemplary on-demand service system according to some embodiments of the present disclosure.

FIG. 1 is a schematic diagram illustrating an exemplary on-demand service system according to some embodiments. For example, the on-demand service system 100 may be an online on-demand service system for transportation services (e.g., taxi hailing, chauffeur services, delivery services, carpool, bus services, take-out services, driver hiring, vehicle hiring, train services, subway services, shuttle services), shopping services, fitness services, learning services, financial services, or the like.

The on-demand service system 100 may include a server 110, a network 120, one or more user terminals (e.g., one or more passenger terminals 130, driver terminals 140), and a storage device 150.

The server 110 may include a processing engine 112. It should be noted that the on-demand service system 100 shown in FIG. 1 is merely an example, and not intended to be limiting. In some embodiments, the on-demand service system 100 may include the passenger terminal(s) 130 or the driver terminal(s) 140. In some embodiments, the on-demand service system 100 may obtain a location of an object (e.g., a passenger associated with a passenger terminal 130, a driver associated with a driver terminal 140, a vehicle, a point of interest (POI), etc.), and determine whether the object belongs to a target geo-fence based on the location of the object. In some embodiments, the on-demand service system 100 may determine a marketing policy (e.g., a pricing policy, a preferential policy) corresponding to the target geo-fence for the object. In some embodiments, for a transportation service, the on-demand service system 100 may determine a security policy for different geo-fences, for example, the on-demand service system 100 may alert the passenger when the vehicle beyond the predetermined target geo-fence.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the one or more user terminals (e.g., the one or more passenger terminals 130, driver terminals 140), and/or the storage device 150 via the network 120. As another example, the server 110 may be directly connected to the one or more user terminals (e.g., the one or more passenger terminals 130, driver terminals 140), and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 300 having one or more components illustrated in FIG. 3 in the present disclosure.

In some embodiments, the server 110 may include a processing engine 112. The processing engine 112 may process information and/or data related to one or more objects. In some embodiments, the processing engine 112 may obtain a location of an object (e.g., a passenger associated with a passenger terminal 130, a driver associated with a driver terminal 140, a vehicle, a point of interest (POI), etc.), and determine whether the object belongs to a target geo-fence based on the location of the object. In some embodiments, the processing engine 112 may determine a marketing policy (e.g., a pricing policy, a preferential policy) corresponding to the target geo-fence for the object. In some embodiments, for a transportation service, the processing engine 112 may determine a security policy for different geo-fences, for example, the processing engine 112 may alert the passenger when the vehicle beyond a predetermined target geo-fence. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the on-demand service system 100 (e.g., the server 110, the one or more passenger terminals 130, the one or more driver terminals 140, or the storage device 150) may send information and/data to other component(s) in the on-demand service system 100 via the network 120. For example, the server 110 may obtain/acquire service request from the passenger terminal 130 via the network 120. As another example, the server 110 may receive information related to one or more objects from the storage 150 directly or via the network 120. As a further example, the server 110 may receive information related to one or more objects from the passenger terminal 130 and/or the driver terminal 140 via the network 120. In some embodiments, the network 120 may be any type of wired or wireless network, or any combination thereof. Merely by way of example, the network 120 may include a cable network, a wireline network, an optical fiber network, a telecommunications network, an intranet, an internet, a local area network (LAN), a wide area network (WAN), a wireless local area network (WLAN), a metropolitan area network (MAN), a wide area network (WAN), a public telephone switched network (PTSN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, the passenger terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the passenger terminal 130 may be a device with positioning technology for locating the position of the service requester and/or the passenger terminal 130.

In some embodiments, the driver terminal 140 may be similar to, or the same device as the passenger terminal 130. In some embodiments, the driver terminal 140 may be a device with positioning technology for locating the position of the driver and/or the driver terminal 140. In some embodiments, the passenger terminal 130 and/or the driver terminal 140 may communicate with other positioning device to determine the position of the service requester, the passenger terminal 130, the driver, and/or the driver terminal 140. In some embodiments, the passenger terminal 130 and/or the driver terminal 140 may send positioning information to the server 110.

The storage device 150 may store data and/or instructions. For example, the data may relate to positioning information of an object, one or more geo-fences, a model for dividing the earth to one or more grids, a service order, or the like, or a combination thereof. In some embodiments, the storage device 150 may store data obtained from the one or more user terminals (e.g., the one or more passenger terminals 130, driver terminals 140). In some embodiments, the storage device 150 may store data and/or instructions that the server 110 may execute or use to perform exemplary methods described in the present disclosure. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components in the on-demand service system 100 (e.g., the server 110, the one or more user terminals, etc.). One or more components in the on-demand service system 100 may access the data and/or instructions stored in the storage device 150 via the network 120. In some embodiments, the storage device 150 may be directly connected to or communicate with one or more components in the on-demand service system 100 (e.g., the server 110, the one or more user terminals, etc.). In some embodiments, the storage device 150 may be part of the server 110.

In some embodiments, one or more components in the on-demand service system 100 (e.g., the server 110, the one or more user terminals, etc.) may have a permission to access the storage device 150. In some embodiments, one or more components in the on-demand service system 100 may read and/or modify information relating to the service requester, driver, and/or the public when one or more conditions are met. For example, the server 110 may read and/or modify one or more users' information after a service. It should be noted that the on-demand service system 100 is merely an example for illustrating an application of the processing engine 112 for determining whether an object belongs to a target geo-fence, determining a marketing policy, and/or determining a security policy. The processing engine 112 may be implemented on one or more other systems (e.g., a geographic information system (ArcGIS), a transport management system, an object tracking system, etc.). The above description of the processing engine 112 and the on-demand service system 100 is provided for the purposes of illustration, and is not intended to limit the scope of the present disclosure.

Figure 2:
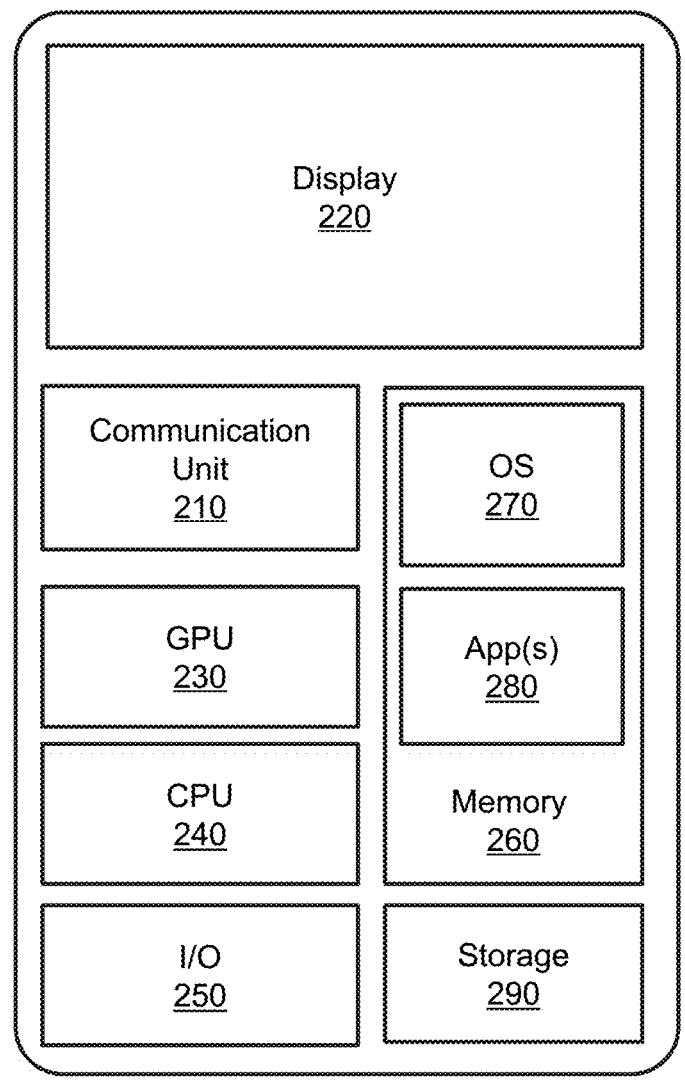
FIG. 2 is a block diagram illustrating an exemplary mobile device configured to implement a specific system disclosed in the present disclosure.

FIG. 2 is a block diagram of an exemplary mobile device configured to implement a specific system disclosed in the present disclosure. In some embodiments, a user terminal device configured to display and communicate information related to locations may be the mobile device 200. The mobile device 200 may include but is not limited to a smartphone, a tablet computer, a music player, a portable game console, a GPS receiver, a wearable calculating device (e.g. glasses, watches, etc.), or the like. The mobile device 200 may include one or more central processing units (CPUs) 240, one or more graphical processing units (GPUs) 230, a display 220, a memory 260, a communication unit 210, a storage unit 290, and one or more input/output (I/O) devices 250. Moreover, the mobile device 200 may also be any other suitable component that includes but is not limited to a system bus or a controller (not shown in FIG. 2). As shown in FIG. 2, a mobile operating system 270 (e.g. IOS, Android, Windows Phone, etc.) and one or more applications 280 may be loaded from the storage unit 290 to the memory 260 and implemented by the CPUs 240. The application 280 may include a browser or other mobile applications configured to receive and process information related to a query (e.g., a name of a location) inputted by a user in the mobile device 200. The passenger/driver may obtain information related to one or more search results through the system I/O device 250, and provide the information to the server 110 and/or other modules or units of the on-demand service system 100 (e.g., the network 120).

In order to implement various modules, units and their functions described above, a computer hardware platform may be used as hardware platforms of one or more elements (e.g., the server 110 and/or other sections of the on-demand service system 100 described in FIGS. 1-16). Since these hardware elements, operating systems and program languages are common, it may be assumed that persons skilled in the art may be familiar with these techniques and they may be able to provide information required in the on-demand service according to the techniques described in the present disclosure. A computer with user interface may be used as a personal computer (PC), or other types of workstations or terminal devices. After being properly programmed, a computer with user interface may be used as a server. It may be considered that those skilled in the art may also be familiar with such structures, programs, or general operations of this type of computer device. Thus, extra explanations are not described for the Figures.

FIG. 3 is a block diagram illustrating exemplary hardware and software components of a computing device on which the server 110, the one or more user terminals (e.g., the one or more passenger terminals 130, driver terminals 140) may be implemented according to some embodiments of the present disclosure. The computing device 300 may be configured to perform one or more functions of the server 110, passenger terminal 130, and driver terminal 140 disclosed in this disclosure. For example, the processing engine 112 may be implemented on the computing device 300 and configured to perform functions of the processing engine 112 disclosed in this disclosure.

The computing device 300 may be a general-purpose computer or a special purpose computer, both may be used to implement an on-demand service system 100 for the present disclosure. The computing device 300 may be used to implement any component of the on-demand service system 100 as described herein. For example, the processing engine 112 may be implemented on the computing device 300, via its hardware, software program, firmware, or a combination thereof. Although only one such computer is shown, for convenience, the computer functions relating to the search service as described herein may be implemented in a distributed fashion on a number of similar platforms to distribute the processing load.

The computing device 300, for example, may include COM ports 350 connected to and from a network connected thereto to facilitate data communications. The computing device 300 may also include a processor 320, in the form of one or more processors, for executing program instructions. The exemplary computer platform may include an internal communication bus 310, program storage and data storage of different forms, for example, a disk 370, and a read only memory (ROM) 330, or a random access memory (RAM) 340, for various data files to be processed and/or transmitted by the computer. The exemplary computer platform may also include program instructions stored in the ROM 330, RAM 340, and/or other type of non-transitory storage medium to be executed by the processor 320. The methods and/or processes of the present disclosure may be implemented as the program instructions. The computing device 300 may also include an I/O component 360, supporting input/output between the computer and other components therein. The computing device 300 may also receive programming and data via network communications.

The computing device 300 may also include a hard disk controller communicated with a hard disk, a keypad/keyboard controller communicated with a keypad/keyboard, a serial interface controller communicated with a serial peripheral equipment, a parallel interface controller communicated with a parallel peripheral equipment, a display controller communicated with a display, or the like, or any combination thereof.

Merely for illustration, only one CPU and/or processor is described in the computing device 300. However, it should be noted that the computing device 300 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 300 executes both operation A and operation B, it should be understood that operation A and operation B may also be performed by two different CPUs and/or processors jointly or separately in the computing device 300 (e.g., the first processor executes operation A and the second processor executes operation B, or the first and second processors jointly execute operations A and B).

Figure 4:
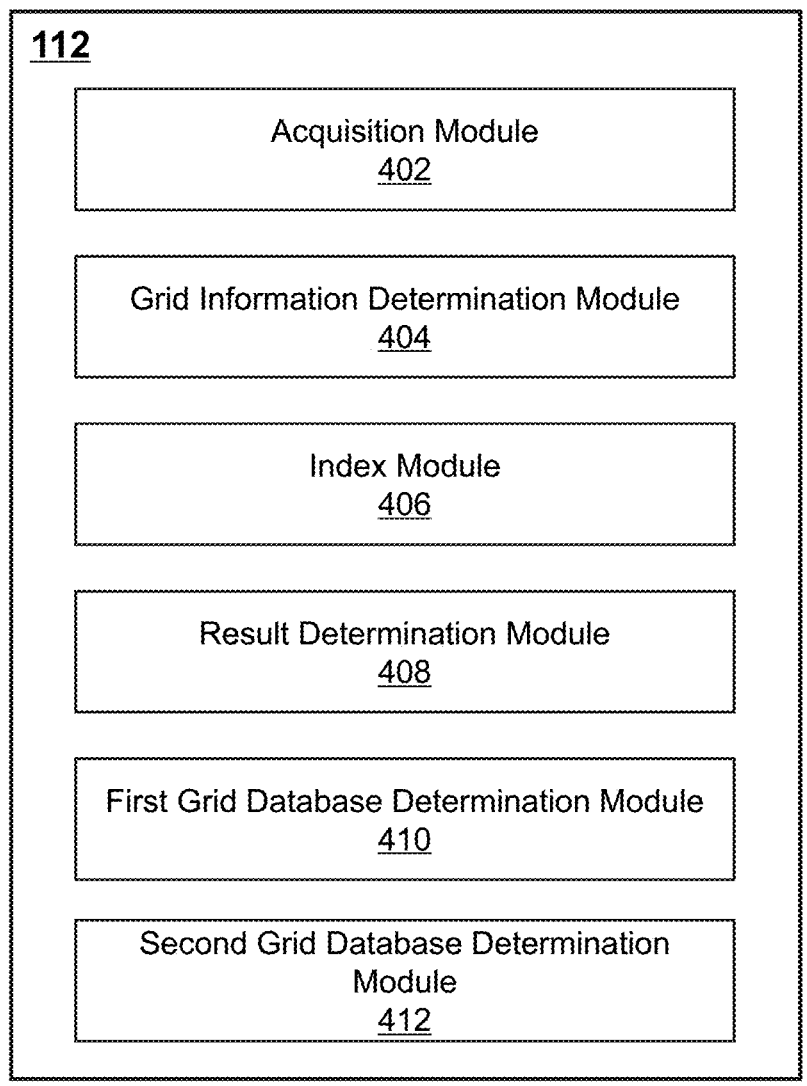
FIG. 4 is a block diagram illustrating an exemplary processing engine according to some embodiments of the present disclosure.

FIG. 4 is a block diagram illustrating an exemplary processing engine 112 according to some embodiments of the present disclosure. In some embodiments, the processing engine 112 may be in communication with a computer-readable storage (e.g., the storage device 150, a user terminal (e.g., a passenger terminal 130, a driver terminal 140, etc.) and may execute instructions stored in the computer-readable storage medium. The processing engine 112 may include an acquisition module 402, a grid information determination module 404, an index module 406, a result determination module 408, a first grid determination module 410, and a second grid determination module 412.

The acquisition module 402 may obtain geographic coordinates corresponding to a geographic location of an object. The object may be any composition of organic and/or inorganic matters that are with or without life and located on the earth. For example, the object may be a service provider (e.g., a driver) or a service requester (e.g., a passenger) using an on-demand service system 100. As another example, the object may be a tool (e.g., a vehicle, a shared bike) for providing a transportation service by using the on-demand service system 100. Yet another example, the object may be a building. In some embodiments, the geographic coordinates corresponding to the geographic location of the object may include longitudinal and latitudinal coordinates of a position where the object locates.

In some embodiments, the acquisition module 402 may obtain the geographic coordinates of the object from one or more components of the on-demand service system 100. In some embodiments, the object may be associated with a device with a positioning function, and the acquisition module 402 may obtain the geographic coordinates from the device. For example, the acquisition module 402 may obtain the geographic coordinates via a GPS receiver mounted on a portable device associated with the object (e.g., a passenger terminal 130, a driver terminal 140, etc.). The acquisition module 402 may continuously or periodically obtain the geographic coordinates of the object from the device.

The grid information determination module 404 may determine information of a grid corresponding to the geographic coordinates. In some embodiments, the grid information determination module 402 may determine the information of the grid corresponding to the geographic coordinates by using a discrete global grid system (DGGS). The grid may refer to a discrete global grid in the DGGS. The information of the grid may include a unique identifier of the grid, geographic data related to a region represented by the grid, and so on. In some embodiments, the grid information determination module 404 may constitute the DGGS and store the DGGS in a storage (e.g., the storage device 150, or the storage 290). Based on the DGGS, the grid information determination module 404 may determine a grid ID corresponding to the geographic coordinates of an object.

The index module 406 may index the grid, based on the information of the grid, in a first grid database. More particularly, the index module 406 may index the grid in the first grid database based on the grid ID. The first grid database may be established by the first grid database determination module 410. The first grid database may include a first data structure, which indicates data corresponding to a plurality of grids. In the first grid database, the plurality of grids may be associated with the target geo-fence.

In some embodiments, the index module 406 may determine whether the first grid database includes the indexed grid ID. For example, the index module 406 may generate a first negative result indicating that the indexed grid is not in the first grid database. As another example, the index module 406 may generate a first positive result indicating that the indexed grid is in the first grid database. In response to the first negative result that the indexed grid is not in the first grid database, the index module 406 may send the first negative result to the result determination module 408. The result determination module 408 may determine that the object does not belong to the target geo-fence. In response to the first positive result that the indexed grid is in the first grid database, the index module 406 may further index the grid, based on the information of the grid, in a second grid database. The second grid database may be established by the second grid database determination module 412. The second grid database may include a second data structure, which indicates data corresponding to the one or more border grids among the plurality of grids that divide the target geo-fence. The second grid database records information related to the border grids, for example, the border grid ID, a local geo-fence ID, and so on. More descriptions of establishing the second grid database may be found elsewhere in the present disclosure (e.g., FIG. 10 and the descriptions thereof).

The index module 406 may index the grid in the second grid database based on the grid ID. The index module 406 may determine whether the second grid database includes the indexed grid ID. For example, the index module 406 may generate a second negative result indicating that the indexed grid is not in the second grid database. As another example, the index module 406 may generate a second positive result indicating that the indexed grid is in the second grid database. The index module 406 may send the second negative result and/or the second positive result to the result determination module 408. In response to the second negative result that the indexed grid is not in the second grid database, the result determination module 408 may determine that the object belongs to the target geo-fence. In response to the second positive result that the indexed grid is in the second grid database, the result determination module 408 may determine whether the object belongs to the target geo-fence based on a relationship of the object and a local geo-fence. The local geo-fence may be a region that the border grid overlaps with the target geo-fence.

In some embodiments, the result determination module 408 may determine the relationship of the object and the local geo-fence based on a ray casting algorithm. For example, the result determination module 408 may determine a ray whose endpoint is the object. The result determination module 408 may determine that the object belongs to the local geo-fence if the ray crosses an odd number of borders of the local geo-fence. The result determination module 408 may determine that the object does not belong to the local geo-fence if the ray crosses an even number of borders of the local geo-fence.

In some embodiments, the result determination module 408 may determine the relationship of the object and the local geo-fence based on a winding number algorithm. The result determination module 408 may determine the winding number associated with the object and the local geo-fence. If the winding number is unequal to zero (or non-zero), the result determination module 408 may determine that the object belongs to the local geo-fence. If the winding number is equal to zero, the result determination module 408 may determine that the object does not belong to the local geo-fence.

Figure 5:
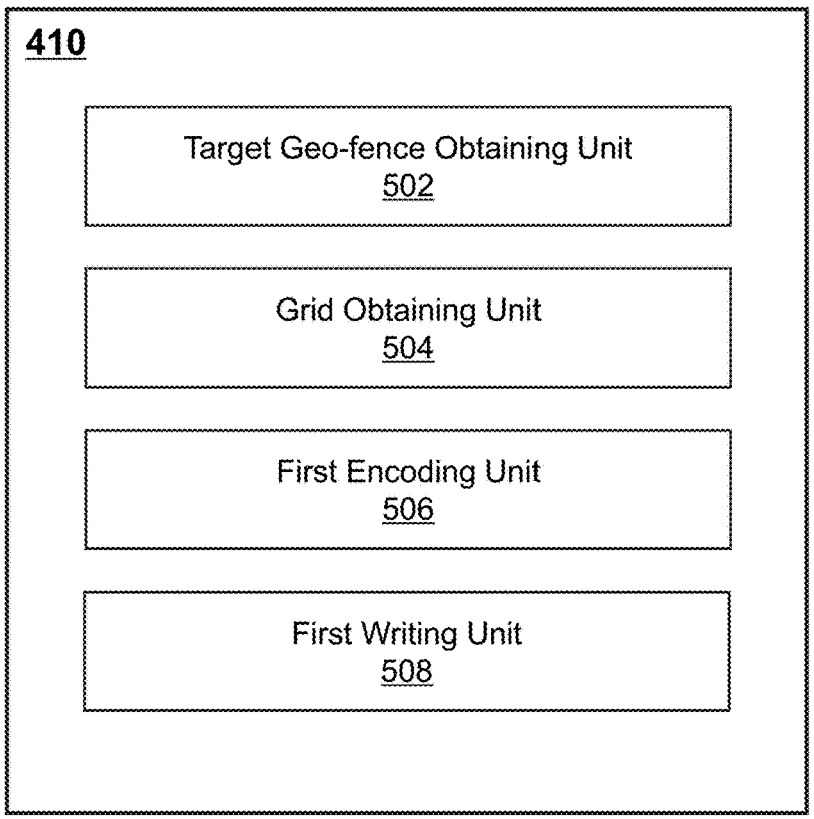
FIG. 5 is a block diagram illustrating an exemplary first grid database determination module according to some embodiments of the present disclosure.

The first grid database determination module 410 may establish the first grid database. In some embodiments, the first grid database determination module 410 may further include a target geo-fence obtaining unit 502, a grid obtaining unit 504, a first encoding unit 506, and a first writing unit 508, as illustrated in FIG. 5. The target geo-fence obtaining unit 502 may obtain a target geo-fence. The target geo-fence may indicate a region of interest (ROI), such as a city, a district, a county, a community, and so on. The grid obtaining unit 504 may obtain a plurality of grids corresponding to the target geo-fence. For example, the target geo-fence may be divided to a plurality of grids via the DGGS. The grid obtaining unit 504 may obtain the plurality of grids from the DGGS. The plurality of grids may include one or more interior grids and one or more border grids. An interior grid entirely fall within a target geo-fence, while a border grid partially, not entirely, fall within the target geo fence, for example, as shown in FIG. 9, the border grid 904 and the interior grid 906. The first encoding unit 506 may encode data corresponding to the plurality of grids into a first data structure. The first data structure may include identifiers of the plurality of grids, and coordinates of the plurality of vertexes of the grids, or the like, or any combination thereof. The first data structure may be various, such as, a B– tree structure, a B+ tree structure, a hush table, a linked list, and so on. The first writing unit 508 may write the encoded data in at least one non-transitory storage medium for establishing the first grid database. For example, the at least one non-transitory storage medium may include the storage device 150 and/or the storage 290 of the on-demand service system 100. As another example, the at least one non-transitory storage medium may include an external storage device separate from the on-demand service system 100. More descriptions of establishing the first grid database may be found elsewhere in the present disclosure (e.g., FIG. 8, and the descriptions thereof).

Figure 6:
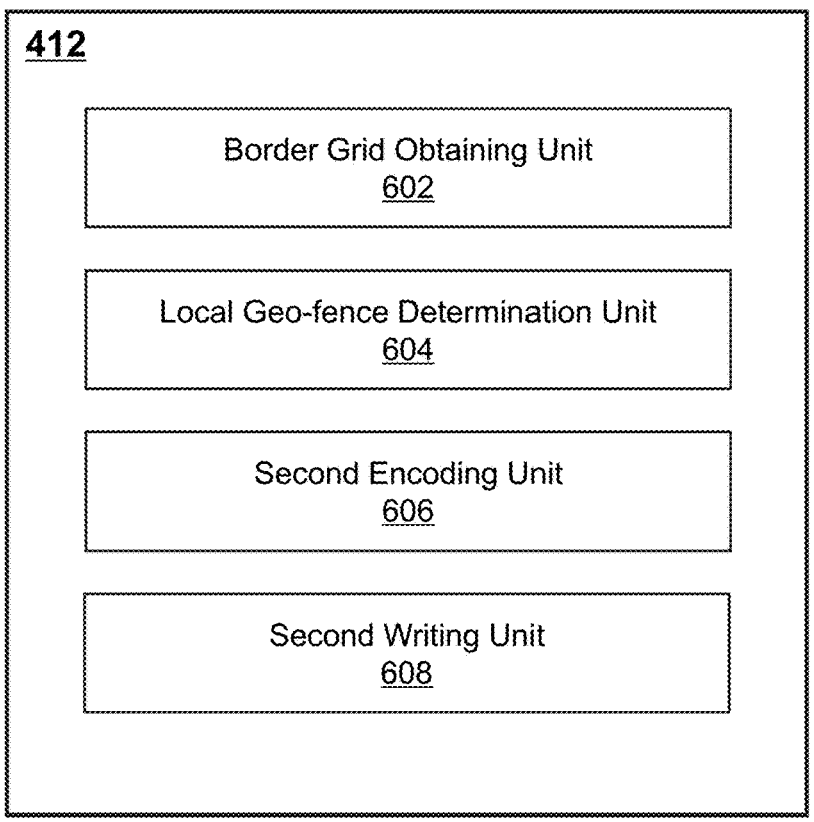
FIG. 6 is a block diagram illustrating an exemplary second grid database determination module according to some embodiments of the present disclosure.

The second grid database determination module 412 may establish the second grid database. In some embodiments, the second grid database determination module 412 may further include a border grid obtaining unit 602, a local geo-fence determining unit 604, a second encoding unit 606, and a second writing unit 608, as illustrated in FIG. 6. The border grid obtaining unit 602 may obtain one or more border grids from the plurality of grids corresponding to the target geo-fence. For example, the grid obtaining unit 504 may obtain the plurality of grids corresponding to the target geo-fence. The plurality of grids may include the one or more interior grids and the one or more border grids. The border grid obtaining unit 602 may further obtain the one or more border grids from the grid obtaining unit 504. The local geo-fence determining unit 604 may determine one or more local geo-fences based on the one or more border grids and the target geo-fence. For example, for each of the one or more border grid, the local geo-fence determining unit 604 may determine a first linked list corresponding to the border grid, for example, a first linked list 1302 (shown in FIG. 13) corresponding to the border grid 1202 (shown in FIG. 12). The local geo-fence determining unit 604 may determine a second linked list 1304 (shown in FIG. 13) corresponding to the target geo-fence 1204 (shown in FIG. 12). Either the first linked list or the second linked list may include a plurality of nodes. The node may include at least one data element, for example, a numbered vertex of the border grid or the target geo-fence. In some embodiments, the first linked list and the second first linked list may be circular doubly linked lists. The local geo-fence determining unit 604 may determine one or more intersection points of the border grid and the target geo-fence. The local geo-fence determining unit 604 may update the first linked list and the second linked list based on the one or more intersection points. The local geo-fence determination unit 604 may determine the one or more local geo-fences based on the updated first linked list and the updated second linked list. More descriptions of determining the one or more local geo-fences may be found elsewhere in the present disclosure (e.g., FIG. 11 and the descriptions thereof).

The second encoding unit 606 may encode data corresponding to the one or more border grids and the one or more local geo-fences into a second data structure. The second data structure may include identifiers of the one or more border grids, identifiers of the one or more local geo-fences, coordinates of vertexes of each of the one or more border grids, and coordinates of vertexes of each of the one or more local geo-fences, or the like, or any combination thereof. The second data structure may be various, such as, a B– tree structure, a B+ tree structure, a hush table, a linked list, and so on.

The second writing unit 608 may write the encoded data in at least one non-transitory storage medium for establishing the second grid database. For example, the at least one non-transitory storage medium may include the storage device 150 and/or the storage 290 of the on-demand service system 100. As another example, the at least one non-transitory storage medium may include an external storage device separate from the on-demand service system 100.

It should be noted that the descriptions above in relation to processing engine 112 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. In some embodiments, the processing engine 112 may include one or more other modules. For example, the processing engine 112 may include a storage module to store data generated by the modules in the processing engine 112. In some embodiments, any two of the modules may be combined as a single module, and any one of the modules may be divided into two or more units.

Figure 7:
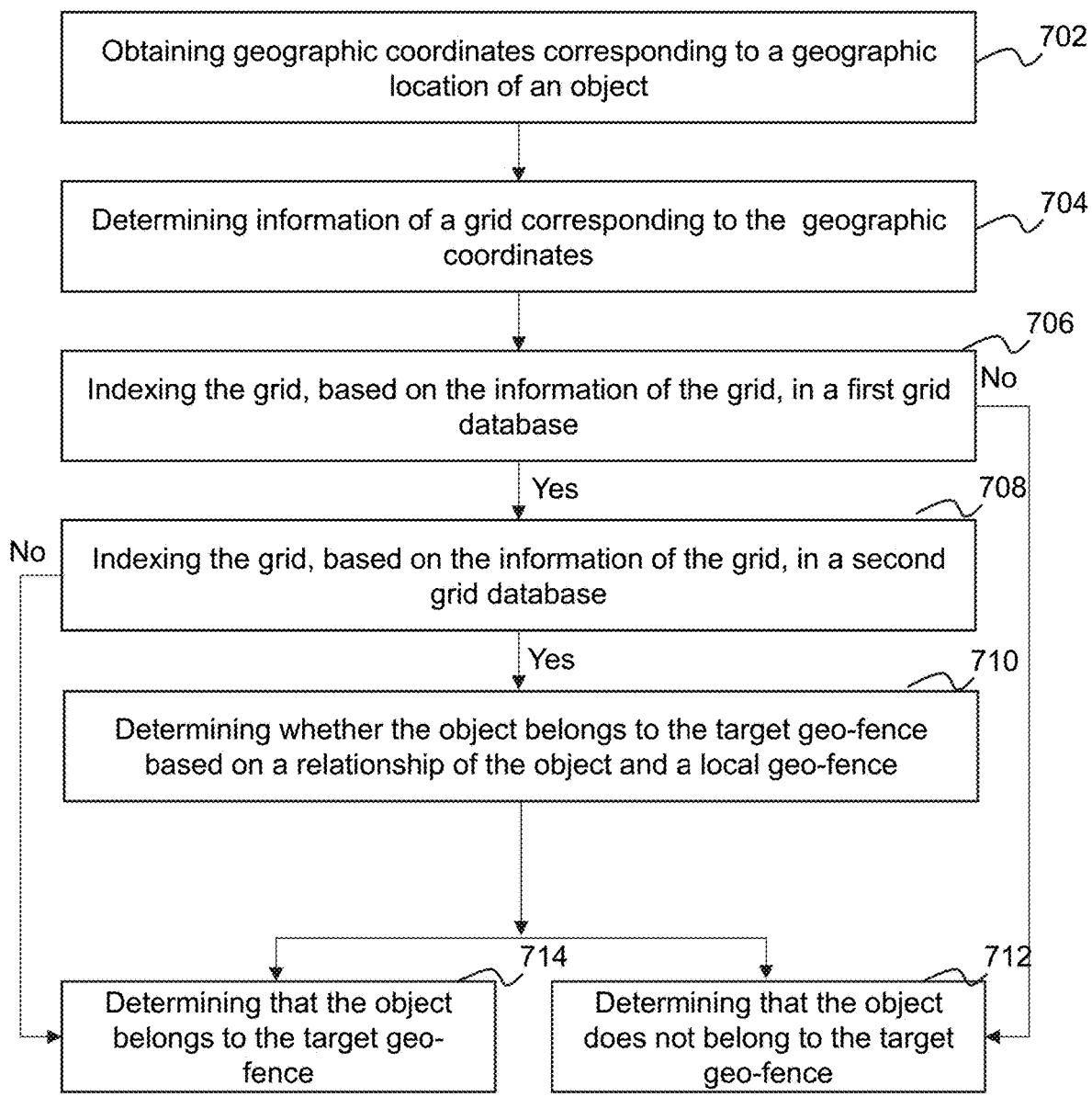
FIG. 7 is a flowchart illustrating an exemplary process for determining whether an object belongs to a target geo-fence according to some embodiments of the present disclosure.

FIG. 7 is a flowchart of an exemplary process for determining whether an object belongs to a target geo-fence according to some embodiments of the present disclosure. In some embodiments, the process 700 for determining whether an object belongs to a target geo-fence may be implemented in the on-demand service system 100 as illustrated in FIG. 1. For example, the process 700 may be implemented in a user terminal (e.g., the passenger terminal 130, the driver terminal 140) and/or the server 110. The process 700 may also be implemented as one or more instructions stored in the storage device 150 and called and/or executed by the processing engine 112. The operations of the illustrated process presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In 702, the processor (e.g., the acquisition module 402 of the processing engine 112) may obtain geographic coordinates corresponding to a geographic location of an object. The object may be any composition of organic and/or inorganic matters that are with or without life and located on the earth. For example, the object may be a service provider (e.g., a driver) or a service requester (e.g., a passenger) using an on-demand service system 100. As another example, the object may be a tool (e.g., a vehicle, a shared bike) for providing a transportation service by using the on-demand service system 100. Yet another example, the object may be a building. In some embodiments, the geographic coordinates corresponding to the geographic location of the object may include longitudinal and latitudinal coordinates of a position where the object locates.

In some embodiments, the processor may obtain the geographic coordinates of the object from one or more components of the on-demand service system 100. In some embodiments, the object may be associated with a device with a positioning function, and the processor may obtain the geographic coordinates from the device. For example, the acquisition module 402 may obtain the geographic coordinates via a GPS receiver mounted on a portable device associated with the object (e.g., a passenger terminal 130, a driver terminal 140, etc.). The processor may continuously or periodically obtain the geographic coordinates of the object from the device. Additionally or alternatively, the device with the positioning function may transmit the geographic coordinates of the object to a storage (e.g., the storage device 150, the storage 290) via the network 120 continuously or periodically. The processor may access the storage and retrieve one or more geographic coordinates of the object at different times.

In 704, the processor (e.g., the grid information determination module 404 of the processing engine 112) may determine information of a grid corresponding to the geographic coordinates.

In some embodiments, the processor may determine the information of the grid corresponding to the geographic coordinates by using a discrete global grid system (DGGS). In some embodiments, the grid may refer to a discrete global grid in the DGGS. The information of the grid may include a unique identifier of the grid, geographic data related to a region represented by the grid, and so on. The DGGS may be used to model the earth's surface. For those skilled in the art, the DGGS includes a series of discrete global grids. Each discrete global grid may represent a partition/region of the earth's surface. The discrete global grids may be used as the geometric basis for the building of geospatial data structures. In the DGGS, the discrete global grid may be assigned a unique identifier (ID). The discrete global grid ID may indicate geographic data related to the region represented by the grid.

In some embodiments, the processor may construct the DGGS and store the DGGS in a storage (e.g., the storage device 150, or the storage 290). For example, the processor may model the earth as a polyhedron. The polyhedron representing the earth may have any shape, for example, a tetrahedron, a cube, an octahedron, an icosahedron, a dodecahedron, etc. In some embodiments, the polyhedron representing the earth may be an octahedron having eight faces with a substantially same size and shape. The octahedron has six vertexes. The longitudinal and latitudinal coordinates of the six vertexes in a geographic coordinate system may be (0, 90), (0, −90), (0, 0), (90, 0), (−90, 0), and (180, 0). The octahedron has eight faces, which correspond to eight equal portions of the earth's surface. Each of the eight faces may represent one of the eight equal portions of the earth's surface. In some embodiments, the processor may divide each face of the polyhedron into a plurality of grids (or cells). Each grid has a shape, such as, hexagon, rhombus, square, rectangle, triangle, and so on. In some embodiments, the plurality of grids may be constituted with same sizes and shapes. In some embodiments, the plurality of grids may be constituted with different sizes and shapes. In a preferred embodiment, each grid may have a same regular hexagonal shape among the plurality of grids.

In some embodiments, the processor may perform a refinement operation for the plurality of grids. The refinement operation may be used to refine one or more faces of the polyhedron (e.g., the octahedron) in order to provide a plurality of grids with a relatively high resolution. The processor may assign a unique identifier to each of the plurality of grids. The DGGS may include globally unique grid/cell indices. Based on the DGGS, the processor may determine a grid ID corresponding to the geographic coordinates of an object.

In some embodiments, the processor may determine first projection coordinates of the geographic location of the object on a corresponding face of the polyhedron based on the geographic coordinates. For example, the processor may transform the geographic coordinates to spherical coordinates. The processor may transform the spherical coordinates to Cartesian coordinates. The processor may transform the Cartesian coordinates to the first projection coordinates. In some embodiments, the processor may determine a target center point nearest to the first projection coordinates of the geographic location of the object. The processor may determine the grid ID associated with the object based on projection coordinates of the target center point on the corresponding face of the polyhedron. The grid ID may form as a string, for example, OL2F0i1234j5678. The grid ID may indicate the information related to the object in the DGGS. Taking an example of the grid ID "OL2F0i1234j5678", where "0" refers to that the polyhedron is an octahedron, "L2" refers to that the refinement level is 2, "F0" refers to that an identifier of the corresponding face of the octahedron is 0, "i1234j5678" refers to that the projection coordinates of the target center point is (12.34, 56.78). More descriptions regarding the embodiments with respect to constructing the DGGS and/or determining the grid ID associated with an object in the DGGS may be found in, e.g., the international application PCT/CN2018/090034, the contents of which are hereby incorporated by reference.

In some embodiments, the processor may determine the grid ID by using a commercial DGGS, for example, PYXIS DIGITAL EARTH DGGS. For example, the grid information determination module 404 may invoke the DGGS by an application program interface (API) connected to the on-demand service system 100 and the DGGS. The geographic coordinates may be input to the DGGS, and the grid information determination module 404 may obtain the grid ID corresponding to geographic coordinates.

In 706, the processor (e.g., the index module 406 of the processing engine 112) may index the grid, based on the information of the grid, in a first grid database. More particularly, the processor may index the grid in the first grid database based on the grid ID. The processor may determine whether the first grid database includes the indexed grid ID.

For example, the index module 406 may generate a first negative result indicating that the indexed grid is not in the first grid database. As another example, the index module 406 may generate a first positive result indicating that the indexed grid is in the first grid database.

In some embodiments, the first grid database may be stored in a storage (e.g., the storage device 150, or the storage 290) of the on-demand service system 100. In some embodiments, the first grid database may be stored in an external storage separate from the on-demand service system 100. The index module 406 may access the first grid database to index the grid.

The first grid database may include a first data structure, which indicates data corresponding to a plurality of grids. In the first grid database, the plurality of grids may be associated with the target geo-fence. For those skilled in the art, the geo-fence may be a virtual perimeter for a real-word geographic area. The geo-fence may correspond to a specific geographic area. The geo-fence may be dynamically generated. For example, the geo-fence is a region where is in a radius around a point location. As another example, the geo-fence is a predefined set of boundaries (such as school zones or neighborhood boundaries). In some embodiments, the target geo-fence may indicate a region of interest (ROI), such as a city, a district, a county, a community, and so on. In the DGGS, the target geo-fence may be divided to the plurality of regular hexagonal grids. The plurality of regular hexagonal grids may include one or more interior grids and one or more border grids. An interior grid entirely fall within a target geo-fence, while a border grid partially, not entirely, fall within the target geo fence. As shown in FIG. 9, let a polygon region be the target geo-fence 902, the target geo-fence 902 may be divided to a plurality of grids, which include one interior grid 906, and multiple border grids 904. More descriptions of establishing the first grid database may be found elsewhere in the present disclosure (e.g., FIG. 8 and the descriptions thereof).

In response to the first negative result that the indexed grid is not in the first grid database, the processor may proceed to operation 712. The processor (e.g., the result determination module 408 of the processing engine 112) may determine that the object does not belong to the target geo-fence.

In response to the first positive result that the indexed grid is in the first grid database, the processor may proceed to operation 708. In 708, the processor (e.g., the index module 406 of the processing engine 112) may index the grid, based on the information of the grid, in a second grid database. More particularly, the processor may index the grid in the second grid database based on the grid ID. The processor may determine whether the second grid database includes the indexed grid ID. For example, the index module 406 may generate a second negative result indicating that the indexed grid is not in the second grid database. As another example, the index module 406 may generate a second positive result indicating that the indexed grid is in the second grid database.

In some embodiments, the second grid database may be stored in a storage (e.g., the storage device 150, or the storage 290) of the on-demand service system 100. In some embodiments, the second grid database may be stored in an external storage separate from the on-demand service system 100. The index module 406 may access the second grid database to index the grid.

The second grid database may include a second data structure, which indicates data corresponding to the one or more border grids among the plurality of grids that divide the target geo-fence. As shown in FIG. 9, the target geo-fence 902 may be divided to the plurality of grids, which include one interior grid 906 and multiple border grids 904. The second grid database records information related to the border grids, for example, the border grid ID, a local geo-fence ID, and so on. More descriptions of establishing the second grid database may be found elsewhere in the present disclosure (e.g., FIG. 10 and the descriptions thereof).

In response to the second negative result that the indexed grid is not in the second grid database, the processor may proceed to operation 714. The processor (e.g., the result determination module 408 of the processing engine 112) may determine that the object belongs to the target geo-fence. In other words, the object may be in a region corresponding to one interior grid of the target geo-fence.

Figure 12:
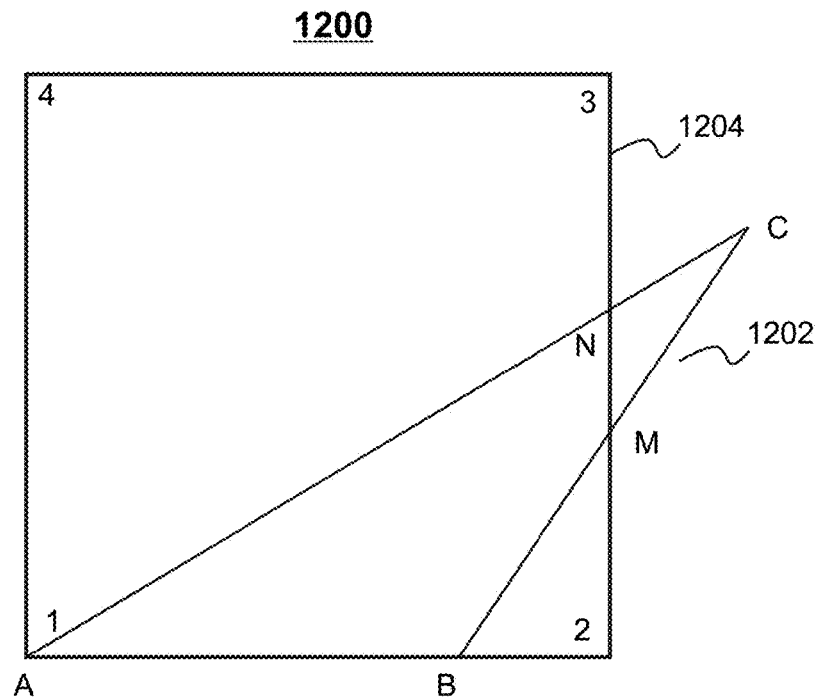
FIG. 12 is a schematic diagram illustrating exemplary operate for determine a local-fence according to some embodiments of the present disclosure.
Figure 14:
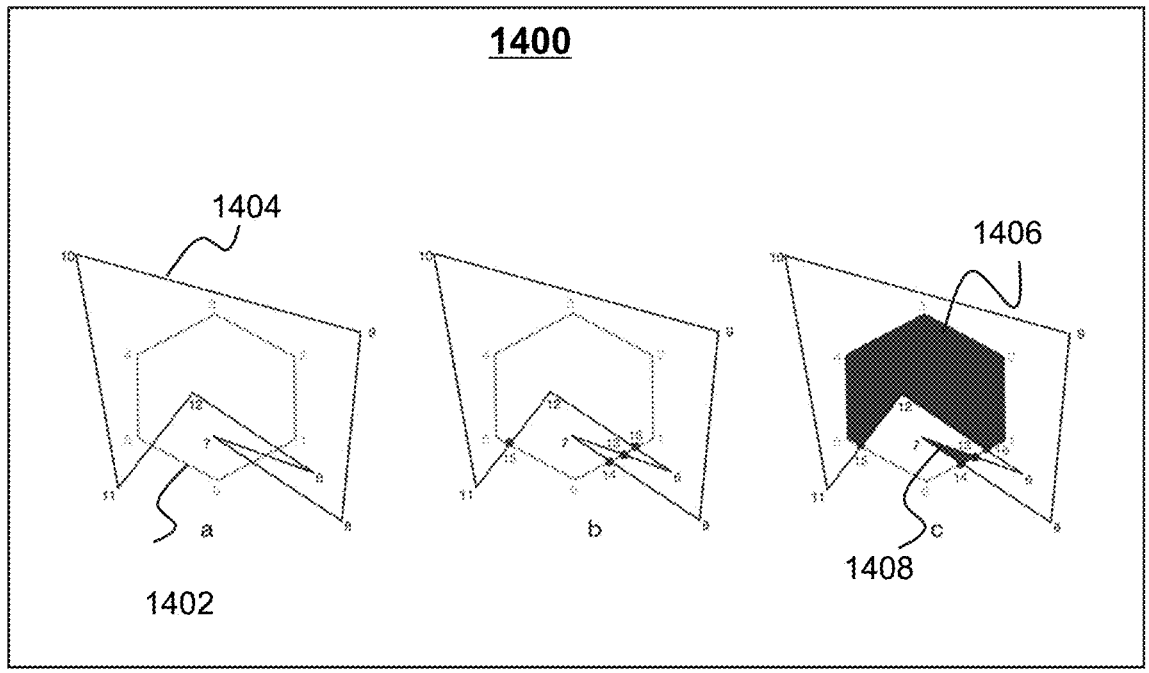
FIG. 14 is a schematic diagram illustrating exemplary operate for determine a local-fence according to some embodiments of the present disclosure.

In response to the second positive result that the indexed grid is in the second grid database, the processor may proceed to operation 710. In 710, the processor (e.g., the result determination module 408 of the processing engine 112) may determine whether the object belongs to the target geo-fence based on a relationship of the object and a local geo-fence. The local geo-fence may refer to a region that the border grid overlaps with the target geo-fence. For example, as shown in FIG. 12, let the triangle ABC be a border grid 1202, let the square 1234 be a target geo-fence 1204, the polygonal region NABM may be designated as the local geo-fence that the border grid 1202 overlaps with the target geo-fence 1204. As another example, as shown in FIG. 14, the border grid 1402 overlaps with the target geo-fence 1404, which forms the local geo-fences 1406 and 1408 (i.e., the dark areas shown in c of FIG. 14).

Although the object is in a certain border grid, for example, the grid ID corresponding to the object in the second grid database, the object may not always belong to the target geo-fence including the certain border grid. It should be understood that, at least one portion of the border grid is in the target geo-fence, while other portion of the border grid is not in the target geo-fence. The at least one portion of the border grid that is in the target geo-fence is designated as at least one local geo-fence. If the object is in the local geo-fence, the object may belong to the target geo-fence. Otherwise, if the object is not in the local geo-fence, the object may not belong to the target geo-fence. Therefore, for determining whether the object belongs to the target geo-fence, the processor may need to determine the relationship of the object and the local geo-fence.

In some embodiments, the second grid database may include information related to one or more local geo-fences, for example, the local geo-fence ID, coordinates of vertexes of the local geo-fence, etc. The processor may determine the one or more local geo-fences that are included in the border grid associated with the object by retrieving the second grid database. The processor may determine the relationship of the object and each of the one or more local geo-fences. For example, assuming that the object is in the border grid A, the result determination module 408 may determine that the border grid A includes two local geo-fences, L1 and L2, based on the second grid database. For each of the two local geo-fences, the processor may determine the relationship of the object and the local geo-fence.

In some embodiments, the processor may determine the relationship of the object and the local geo-fence based on a ray casting algorithm. More particularly, the object may be abstracted to a given point. The result determination module 408 may determine the ray whose endpoint is the object. The direction of the ray may point to a border of the local geo-fence that have a polygonal shape. For example, the direction of the ray may be perpendicular to a border of the polygonal local geo-fence (e.g., the border that is the nearest from the ray's endpoint). In some embodiments, the processor may determine that the object belongs to the local geo-fence if the ray crosses an odd number of borders of the local geo-fence, such as 3, 5, 7, etc. The processor may determine that the object does not belong to the local geo-fence if the ray crosses an even number of borders of the local geo-fence, such as 2, 4, 6, etc.

Figure 15:
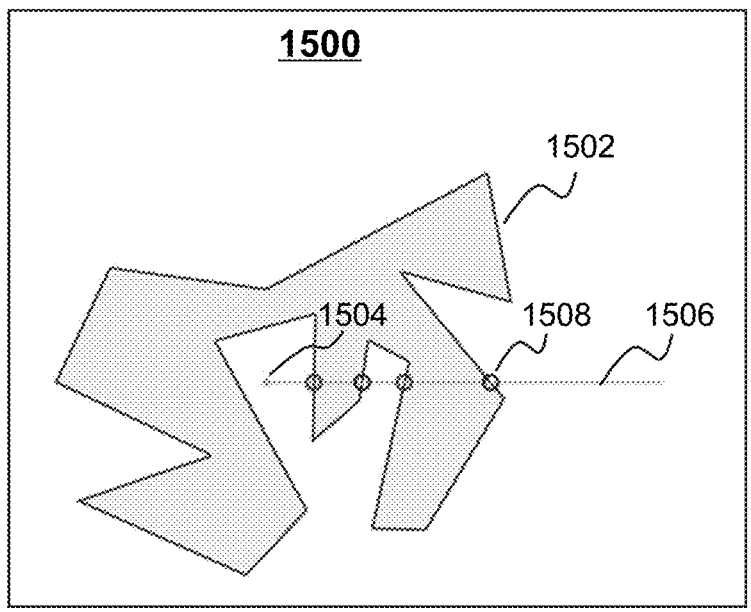
FIG. 15 is a schematic diagram illustrating an exemplary relationship that an object does not belong to a local geo-fence according to some embodiments of the present disclosure.
Figure 16:
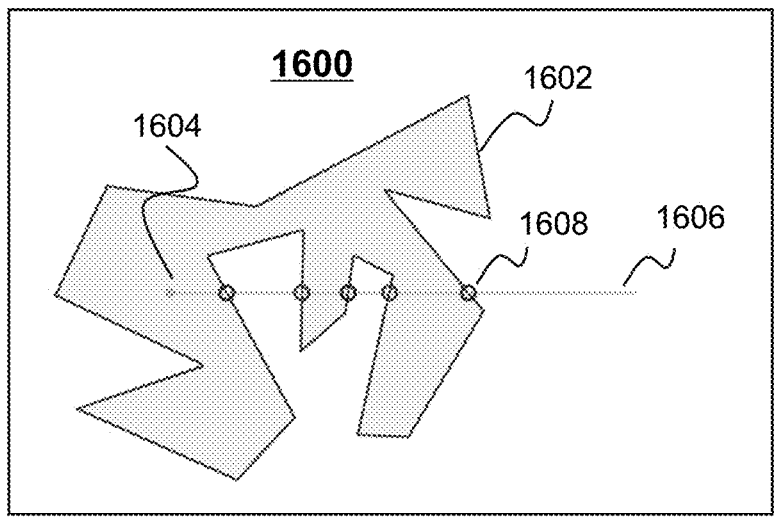
FIG. 16 is a schematic diagram illustrating exemplary a relationship that an object belongs to a local geo-fence according to some embodiments of the present disclosure.

Merely for illustration, FIG. 15 is a schematic diagram illustrating a relationship that an object does not belong to a local geo-fence, and FIG. 16 is a schematic diagram illustrating a relationship that an object belongs to a local geo-fence. As illustrated in FIG. 15, a polygonal region 1502 represent the local geo-fence, a point 1504 represents the object, a ray 1506 is a ray whose endpoint is the point 1504. The object is outside the region of the local geo-fence. In this case, the ray 1506 crosses four borders of the local geo-fence 1502, and generates four intersection points of the ray 1506 and the borders accordingly, for example, the intersection points 1508. It is shown that the object does not belong the local geo-fence if the ray, whose endpoint is the object, crosses the even number of borders of the local geo-fence. As illustrated in FIG. 16, a polygonal region 1602 represent the local geo-fence, a point 1604 represents the object, a ray 1606 is a ray whose endpoint is the point 1604. The object is inside the region of the local geo-fence. In this case, the ray 1606 crosses five borders of the local geo-fence 1602, and generates five intersections of the ray 1606 and the borders accordingly, for example, the intersection points 1608. It is shown that the object belongs the local geo-fence if the ray, whose endpoint is the object, crosses the odd number of borders of the local geo-fence. In some embodiments, if the ray, whose endpoint is the object, crosses one border of the local geo-fence, the object may be in the border of the local geo-fence, that is, the object also belongs to the local geo-fence.

In some embodiments, the processor may determine the relationship of the object and the local geo-fence based on a winding number algorithm. In polygons, the winding number refers to the number of times that the polygonal border winds around a given point. The winding number depends on the orientation that the polygonal border winds the given point. For example, if the orientation is counter-clockwise, the winding number is positive. If the orientation is clockwise, the winding number is negative. Base on the winding number algorithm, the processor may determine the winding number associated with the object and the local geo-fence. For example, the object is abstracted to the given point, the local geo-fence is the polygon, the result determination module 408 may determine all angles formed by consecutive polygon vertexes and the given point, and determine the winding number by summing up the all angles subtended by each border (or edge) of the polygon. If the winding number is unequal to zero (or non-zero), the processor may determine that the object belongs to the local geo-fence. If the winding number is equal to zero, the processor may determine that the object does not belong to the local geo-fence.

In some embodiments, in response to the determination that the object belongs to the target geo-fence, the processor may customize a marketing policy for the object (e.g., a service requester or a service provider). For example, when the processor monitors that a service provider and/or a service requester is in a target geo-fence predefined by the DGGS, such as, the predefined target geo-fence corresponds to Haidian District in Beijing City, the processor may send an instruction for displaying advertising information on the service requester terminal and/or the service provider terminal. The advertising information may be displayed via various forms, for a message, an image, a video or an audio. In some embodiments, the advertising information may include a pricing policy and/or a preferential policy associated with the on-demand service. For example, if there are abundant service requests in the region corresponding to the target geo-fence, the service award for the on-demand service may be adjusted higher, which can encourage more service providers to provide the on-demand services. The processor may send the advertising information that includes the service award to the service providers in the target geo-fence. As another example, assuming that a third-party business desires to send targeted advertisement to the service requesters or the service providers in a specific region, the specific region may be predefined as the target geo-fence, the processor may monitor the service requesters or the service providers in the region of the target geo-fence. Upon occurrence of the service requester or the service provider in the region of the target geo-fence, the processor may send the advertise information of the third-party business to the service requester or service provider.

In some embodiments, in response to the determination that the object belongs to the target geo-fence, the processor may customize a security policy for the object (e.g., a service requester or a service provider). For a transportation service, such as a car hailing service, a pick-up location and a drop-off location may be obtained by the on-demand service system 100, a target geo-fence including the drop-off location may be predefined. After an estimated time of arrival (ETA), if the processor monitors that the service provider is not in the region of the target geo-fence, or far away from the region of the target geo-fence, the processor may send a security alert to the service requester.

In some embodiments, the processor may determine a service capacity of an on-demand service platform in connection with the process 700. Merely for illustration, the processor may obtain geographic coordinates of a plurality of service providers. The processor may determine information of grids (e.g., the grid IDs) corresponding to the geographic coordinates by using the DGGS. For each of the grid IDs, the processor may index the grid ID in the first grid database. The first database may record all grids that divide the target geo-fence. The processor may identify first grid IDs included in the first grid database. The processor may index each first grid ID in the second grid database. The second grid database may record one or more border grids of the all grids that divide the target geo-fence. The processor may determine second grid IDs that are not included in the second grid database. The number of service providers corresponding to the second grid IDs may be counted. The processor may determine third grid IDs that are included in the second grid database. For at least one local geo-fence associated with each of third grid IDs, the processor may determine the service providers that belong to the at least one local geo-fence. The processor may determine a total number of the service providers in the region of the target geo-fence based on the number of service providers corresponding to the second grid IDs and the number of the service providers that belong to the at least one local geo-fence. The processor may further determine the service capacity in the region of the target geo-fence based on the determined total number. In some embodiments, the processor may display the service capacity on a map. In some embodiments, the processor may determine a scheduling policy based on the service capacity. For example, if the service capacity is lower than a threshold in the region of the target geo-fence, the processor may schedule more service providers to the region of the target geo-fence.

It should be noted that the above description is merely provided for the purpose of illustration, and not intended to limit the scope of the present disclosure. For persons having ordinary skills in the art, multiple variations and modifications may be made under the teachings of the present disclosure. For example, the first grid database and the second grid database may be stored in different storages respectively. As another example, the first grid database and the second grid database may be stored in a same storage (e.g., the storage device 150 or the storage 290). However, those variations and modifications do not depart from the scope of the present disclosure.

Figure 8:
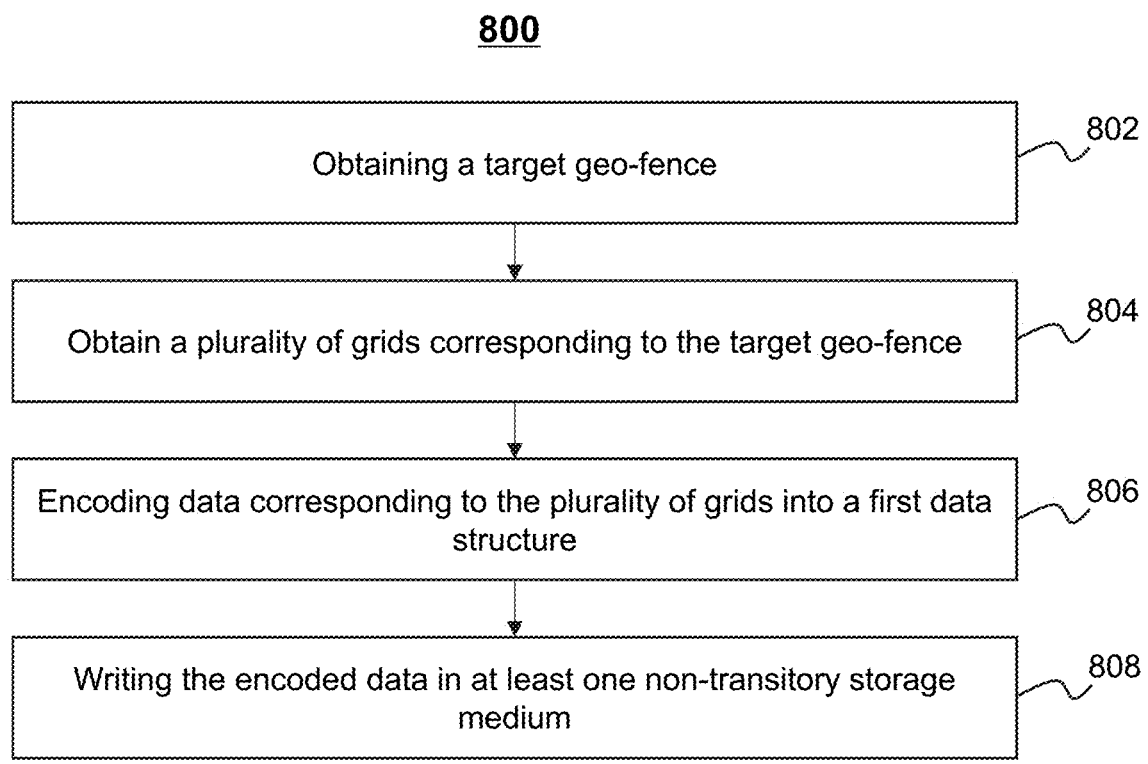
FIG. 8 is a flowchart illustrating an exemplary process for establishing a first grid database according to some embodiments of the present disclosure.
Figure 9:
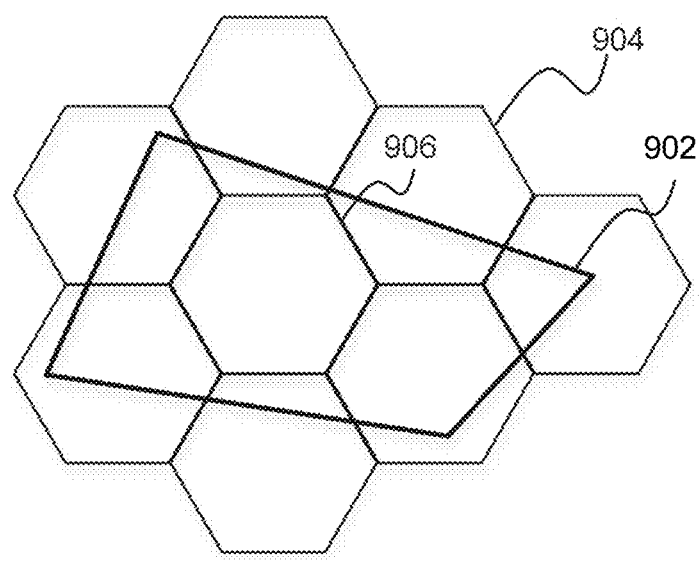
FIG. 9 is a schematic diagram illustrating a relationship of a target geo-fence and one or more grids according to some embodiments of the present disclosure.

FIG. 8 is a flowchart of an exemplary process for establishing a first grid database according to some embodiments of the present disclosure. In some embodiments, the process 800 for determining the first grid database may be implemented in the on-demand service system 100 as illustrated in FIG. 1. For example, the process 800 may be implemented in a user terminal (e.g., the passenger terminal 130, the driver terminal 140) and/or the server 110. The process 800 may also be implemented as one or more instructions stored in the storage device 150 and called and/or executed by the processing engine 112. The operations of the illustrated process presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting.

In 802, the processor (e.g., the target geo-fence obtaining unit 502 of the first grid determination module 410) may obtain a target geo-fence. The target geo-fence may indicate a region of interest (ROI), such as a city, a district, a county, a community, and so on.

In some embodiments, the target geo-fence may be constructed via the on-demand service system 100. For example, a user of the on-demand service system 100 may designate a specific geographic area (e.g., Haidian District in Beijing City) as the ROI, and construct the target geo-fence corresponding to the ROI. In general, the geographic area has an irregular shape, such as a polygon, the target geo-fence may have the irregular shape accordingly. Note that the shape of the target geo-fence may be various, such as an irregular shape or a regular shape, which depends on the shape of corresponding ROI.

In 804, the processor (e.g., the grid obtaining unit 504 of the first grid determination module 410) may obtain a plurality of grids corresponding to the target geo-fence. For example, the grid obtaining unit 504 may obtain the plurality of grids from the DGGS implemented on the on-demand service platform.

In some embodiments, the target geo-fence may be divided to a plurality of grids via the DGGS. Each of the plurality of grids may be a discrete global grid (or a cell). Each of the plurality of grids may include a polygon having a plurality of vertexes. As used herein, each gird may have the same shape of a regular hexagon, for example, grids 904 and 906 shown in FIG. 9, or a grid 1402 shown in FIG. 14. However, in some embodiments, the shape of grid may be various, such as a triangle, a square, a rectangle, and so on. The plurality of grids may be constituted with same sizes and shapes. The plurality of grids may also be constituted with different sizes and shapes.

In some embodiments, the plurality of grids may include one or more interior grids and one or more border grids. The whole interior grid may be included in the target geo-fence, for example, the interior grid 906 shown in FIG. 9. At least one portion of the border grid may be included in the target geo-fence, for example, the border grid 904 shown in FIG. 9. As used herein, the at least one portion of the border grid included in the target geo-fence may be used to constitute a local geo-fence.

Merely for illustration, FIG. 9 is a schematic diagram illustrating a relationship of a target geo-fence and one or more grids according to some embodiments of the present disclosure. As illustrated in FIG. 9, the processor may designate a ROI (i.e., the bold polygon) as the target geo-fence 902. According to the DGGS, the target geo-fence 902 is divided to eight hexagonal grids, including seven border grids and one interior grid 906. The border grid 904 represents one of the seven border grids.

In 806, the processor (e.g., the first encoding unit 506 of the first grid determination module 410) may encode data corresponding to the plurality of grids into a first data structure. The first data structure may include identifiers of the plurality of grids, and coordinates of the plurality of vertexes, or the like, or any combination thereof. In some embodiments, the first data structure may be in the form of key-value. The key may indicate the grid ID. The key may point to one or more values. The value may indicate the coordinates of vertexes of the grid corresponding to the grid ID. In some embodiments, the coordinates may indicate latitude and longitude coordinates of each of the plurality of vertexes. Merely for illustration, the first encoding unit 506 may generate a unique identifier (or ID) for each of the plurality of girds based on MD5 Message-Digest Algorithm. The grid ID may point to coordinates of the grid corresponding to the grid ID. It should be understood that, the first data structure may be various, such as, a B− tree structure, a B+ tree structure, a hush table, a linked list, and so on. Such variations may be within the scope of the present disclosure.

In 808, the processor (e.g., the first writing unit 508 of the first grid determination module 410) may write the encoded data in at least one non-transitory storage medium for establishing the first grid database. For example, the at least one non-transitory storage medium may include the storage device 150 and/or the storage 290 of the on-demand service system 100. As another example, the at least one non-transitory storage medium may include an external storage device separate from the on-demand service system 100.

It should be noted that the above description is merely provided for the purpose of illustration, and not intended to limit the scope of the present disclosure. For persons having ordinary skills in the art, multiple variations and modifications may be made under the teachings of the present disclosure. For example, the first grid database may be further stored in an external storage medium separate from the on-demand service system 100. As another example, the first grid database may be updated according to the target geo-fence in different DGGS. However, those variations and modifications do not depart from the scope of the present disclosure.

Figure 10:
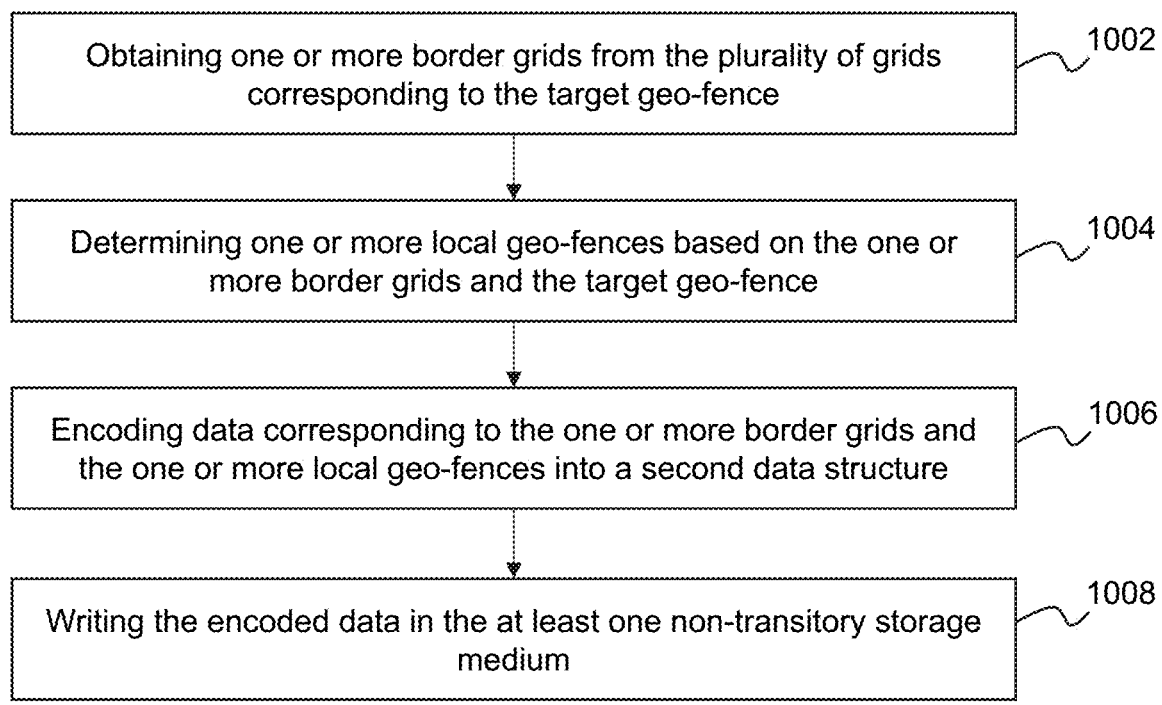
FIG. 10 is a flowchart illustrating an exemplary process for establishing a second grid database according to some embodiments of the present disclosure.

FIG. 10 is a flowchart of an exemplary process for establishing a second grid database according to some embodiments of the present disclosure. In some embodiments, the process 1000 for determining the second grid database may be implemented in the on-demand service system 100 as illustrated in FIG. 1. For example, the process 1000 may be implemented in a user terminal (e.g., the passenger terminal 130, the driver terminal 140) and/or the server 110. The process 1000 may also be implemented as one or more instructions stored in the storage device 150 and called and/or executed by the processing engine 112. The operations of the illustrated process presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below is not intended to be limiting.

In 1002, the processor (e.g., the border grid obtaining unit 602 of the second grid determination module 412) may obtain one or more border grids from the plurality of grids corresponding to the target geo-fence. In some embodiments, the grid obtaining unit 504 may obtain the plurality of grids corresponding to the target geo-fence, as illustrated in 804 of FIG. 8. The plurality of grids may include the one or more interior grids and the one or more border grids. The border grid obtaining unit 602 may obtain the one or more border grids from the grid obtaining unit 504.

In 1004, the processor (e.g., the local geo-fence determination unit 604 of the second grid determination module 412) may determine one or more local geo-fences based on the the one or more border grids and the target geo-fence. The local geo-fence may be a region that the border grid overlaps with the target geo-fence.

Figure 13:
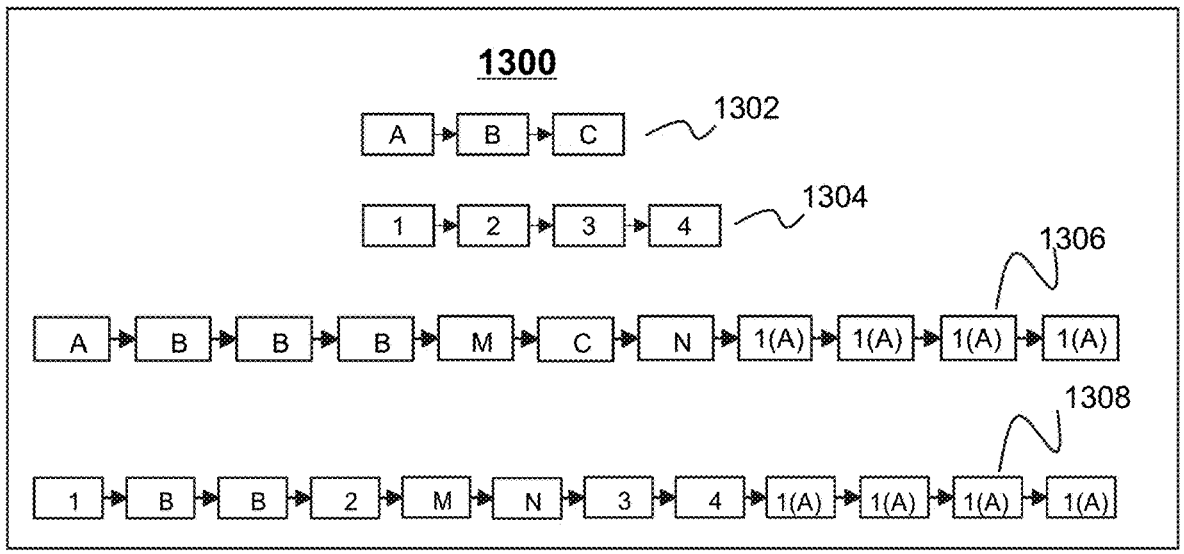
FIG. 13 is a schematic diagram illustrating exemplary a linked list according to some embodiments of the present disclosure.

In some embodiments, for each of the one or more border grid, the processor may determine a first linked list corresponding to the border grid, for example, a first linked list 1302 (shown in FIG. 13) corresponding to the border grid 1202 (shown in FIG. 12). The processor may determine a second linked list 1304 (shown in FIG. 13) corresponding to the target geo-fence 1204 (shown in FIG. 12). In the first linked list, each node, represented by a rectangular box shown in FIG. 13, may correspond to one vertex of the border grid. Similar to the first linked list, in the second linked list, each node may also correspond to one vertex of the target geo-fence. The processor may determine one or more intersection points of the border grid and the target geo-fence, for example, point A (1), point B, point M and point N, as shown in FIG. 12. The processor may update the first linked list and the second linked list based on the one or more intersection points, for example, the updated first linked list 1306 and the updated second linked list 1308, as shown in FIG. 13. The processor may determine the one or more local geo-fences based on the updated first linked list and the updated second linked list. More descriptions of determining the one or more local geo-fences may be found elsewhere in the present disclosure (e.g., FIGS. 11-14, and the descriptions thereof).

In 1006, the processor (e.g., the second encoding unit 606 of the second grid determination module 412) may encode data corresponding to the one or more border grids and the one or more local geo-fences into a second data structure. The second data structure may include identifiers of the one or more border grids, identifiers of the one or more local geo-fences, coordinates of vertexes of each of the one or more border grids, and coordinates of vertexes of each of the one or more local geo-fences, or the like, or any combination thereof. In some embodiments, the second data structure may be in the form of key-value. The key may point to one or more values. For example, the key may indicate a border grid ID, the key may indicate multiple values, such as the coordinates of vertexes of the border grid and the coordinates of vertexes of the one or more local geo-fences corresponding to the border grid ID. In some embodiments, the coordinates may indicate latitude and longitude coordinates of the vertexes.

In some embodiments, the second encoding unit 606 may obtain the identifiers of the one or more border grids from the first encoding unit 506. The identifiers of the one or more border grids may be consistence with the ones of the first gird database. For example, assuming that the identifier of the border grid A is "OL2F0i1234j5678" in the first grid database, accordingly the identifier of the border grid A may also be the "OL2F0i1234j5678" in the second grid database. In some embodiments, the second encoding unit 606 may generate a unique identifier for each of the one or more local geo-fences based on MD5 Message-Digest Algorithm. The border grid ID may point to the coordinates of vertexes of the corresponding border grid. The local geo-fence ID may point to the coordinates of vertexes of the corresponding local geo-fence. Similar to the first data structure, the second data structure may be various, such as, a B– tree structure, a B+ tree structure, a hush table, a linked list, and so on. Such variations may be within the scope of the present disclosure.

In 1008, the processor (e.g., the second writing unit 608 of the second grid determination module 412) may write the encoded data in at least one non-transitory storage medium for establishing the second grid database. For example, the at least one non-transitory storage medium may include the storage device 150 and/or the storage 290 of the on-demand service system 100. As another example, the at least one non-transitory storage medium may include an external storage device separate from the on-demand service system 100. In some embodiments, the first grid database and the second grid database may be integrated to a single non-transitory storage medium (e.g., the storage device 150).

It should be noted that the above description is merely provided for the purpose of illustration, and not intended to limit the scope of the present disclosure. For persons having ordinary skills in the art, multiple variations and modifications may be made under the teachings of the present disclosure. For example, the second grid database may be further stored in an external storage medium separate from the on-demand service system 100. As another example, the second grid database may be updated according to the target geo-fence in different DGGS. However, those variations and modifications do not depart from the scope of the present disclosure.

Figure 11:
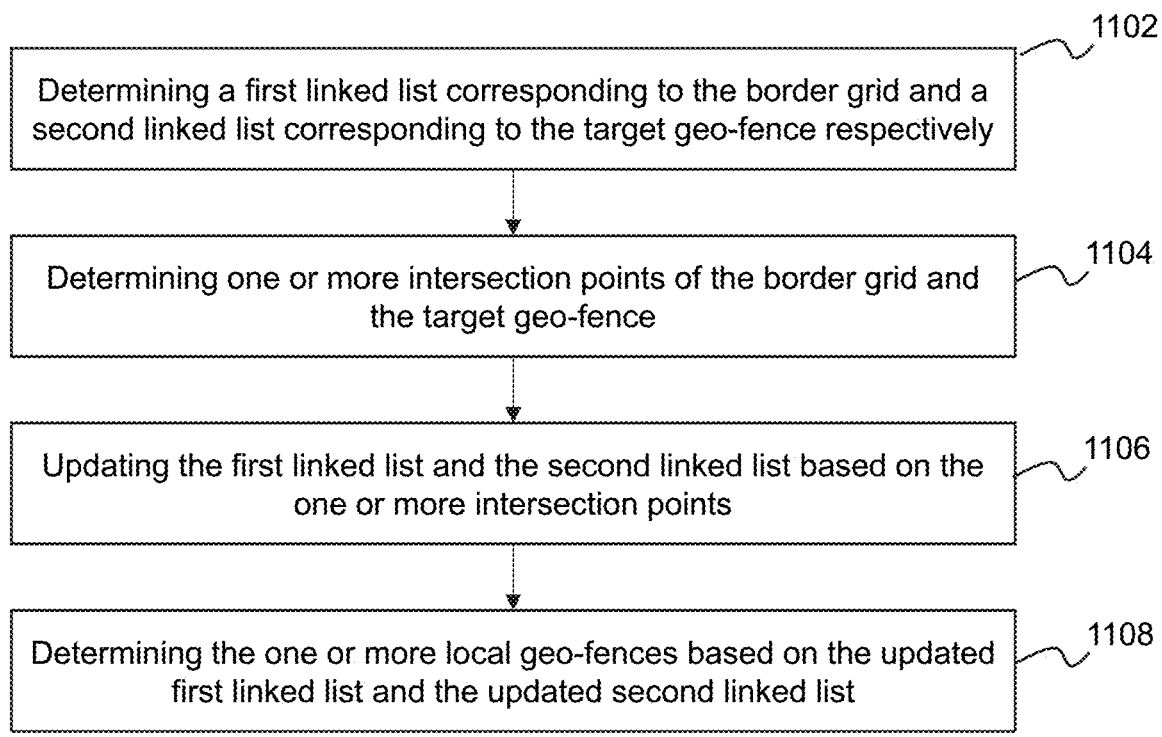
FIG. 11 is a flowchart illustrating an exemplary process for determining one or more local geo-fences according to some embodiments of the present disclosure.

FIG. 11 is a flowchart of an exemplary process for determining one or more local geo-fences according to some embodiments of the present disclosure. In some embodiments, the process 1100 for determining one or more local geo-fences may be implemented in the on-demand service system 100 as illustrated in FIG. 1. For example, the process 1100 may be implemented in a user terminal (e.g., the passenger terminal 130, the driver terminal 140) and/or the server 110. The process 1100 may also be implemented as one or more instructions stored in the storage device 150 and called and/or executed by the processing engine 112. The operations of the illustrated process presented below are intended to be illustrative. In some embodiments, the process 1100 may be accomplished with one or more additional operations not described, and/or without one or more of the operations discussed. Additionally, the order in which the operations of the process 1100 as illustrated in FIG. 11 and described below is not intended to be limiting.

In 1102, the processor (e.g., the local geo-fence determination unit 604 of the second grid determination module 412) may determine a first linked list corresponding to the border grid and a second linked list corresponding to the target geo-fence respectively. Either the first linked list or the second linked list may include a plurality of nodes. The node may include at least one data element, for example, a numbered vertex of the border grid or the target geo-fence. The element may point to a next node. Merely for illustration, as illustrated in FIG. 12 and FIG. 13, assuming that the triangle region denotes a border grid 1202, the square region denotes the target geo-fence 1204. Each vertex of border grid 1202 may be numbered a unique character, such as, A, B, C. Each vertex of the target geo-fence 1204 may be numbered a unique character, such as, 1, 2, 3, and 4. The numbered 1 and A are the same vertex. The local geo-fence determination unit 604 may determine the first linked list 1302 corresponding to the border grid 1202, and the second linked list 1304 corresponding to the target geo-fence 1204. The node may be represented by a rectangle box, and correspond to one vertex. In the first linked list 1302 and the second linked list 1304, the sequence of nodes may be the same. For example, the nodes of either the first linked list 1302 or the second linked list 1304 is sorted counterclockwise. In some embodiment, coordinates of the corresponding vertex may be obtained by indexing the node.

In some embodiments, a type of the first linked list or the second first linked list may include a singly linked list, a doubly linked list, a circular linked list, a circular doubly linked list, or the like, or any combination thereof. As used herein, the first linked list and the second first linked list are the circular doubly linked lists. Each node in the circular doubly linked list may point to the next node and previous node in the list. In the circular doubly linked list, the processor may easily add or remove nodes at the beginning or the end of a list, even in the middle of the list.

In 1104, the processor (e.g., the local geo-fence determination unit 604 of the second grid determination module 412) may determine one or more intersection points of the border grid and the target geo-fence.

In some embodiments, the processor may traverse each border (or edge) of the border grid and the target geo-fence respectively. It should be understood that, in Mathematic, each border may be represented by a plurality of discrete data points. Each data point may indicate the coordinates of a geographical point in the border. If there is the same data point in the border of the border grid and the target geo-fence, the processor may designate the same data point as the intersection point. As shown in FIG. 12, point A (or 1), point M and point N are the intersection points of the border grid 1202 and the target geo-fence 1204. Similarly, the processor may determine the one or intersection points of all the borders of the border grid and the target geo-fence.

In 1106, the processor (e.g., the local geo-fence determination unit 604 of the second grid determination module 412) may update the first linked list and the second linked list based on the one or more intersection points.

In some embodiments, because the first linked list 1302 and the second linked list 1304 are the circular doubly linked lists, the processor may easily add the one or more intersection points to the original lists for updating. For example, the local geo-fence determination unit 604 may determine the updated first linked list 1306, and the updated second linked list 1308.

Merely for illustration, Table. 1 illustrates an exemplary operation for updating the first linked list and the second linked list.

TABLE 1

| No. | Category | Border | Linked list |
|---|---|---|---|
| 1 | grid 1202 | AB | A→B→B→C→1(A) |
|   | geo-fence 1204 | 12 | 1→B→2→3→4→1(A) |
| 2 | grid 1202 | AB | A→B→B→C→1(A)→1(A) |
|   | geo-fence 1204 | 41 | 1→B→2→3→4→1(A)→1(A) |
| 3 | grid 1202 | BC | A→B→B→B→C→1(A)→1(A) |
|   | geo-fence 1204 | 12 | 1→B→B→2→3→4→1(A)→1(A) |
| 4 | grid 1202 | BC | A→B→B→B→M→C→1(A)→1(A) |
|   | geo-fence 1204 | 23 | 1→B→B→2→M→3→4→1(A)→1(A) |
| 5 | grid 1202 | CA | A→B→B→B→M→C→1(A)→1(A)→1(A) |
|   | geo-fence 1204 | 12 | 1→B→B→2→M→3→4→1(A)→1(A)→1(A) |
| 6 | grid 1202 | CA | A→B→B→B→M→C→N→1(A)→1(A)→1(A) |
|   | geo-fence 1204 | 23 | 1→B→B→2→M→N→3→4→1(A)→1(A)→1(A) |
| 7 | grid 1202 | CA | A→B→B→B→M→C→N→1(A)→1(A)→1(A)→1(A) |
|   | geo-fence 1204 | 41 | 1→B→B→2→M→N→3→4→1(A)→1(A)→1(A)→1(A) |

Seen from Table. 1, the intersection points in the borders of the border grid 1202 and the target geo-fence 1204 may be added to the original linked lists (e.g., the first linked list 1302 and the second linked list 1304). For example, for No.2 of the Table.1, there are three intersection points in the border AB and the border 12, that is, point B, point A and point 1. It is fact that the point A and point 1 are the same point, they may be denoted by 1(A) or A (1). The intersection points may be added to the first linked list 1302, that is, A→B→B→C→1(A). The intersection points may be added to the second linked list 1304, that is, 1→B→2→3→4→1 (A). For No.2 of Table1, the intersection points in the border AB and 41 may be added to the previous updated first linked list and the previous updated linked list. By that analogy, the processor may traverse each intersected border associated with the border grid and the target geo-fence, and add the intersection points to corresponding linked lists. A target first linked list and a target second linked list may be determined, for example, the updated first linked list 1302 and the updated linked list 1304. In some embodiments, the intersection points added to the first linked list or the second linked list may be labelled, which are used to differ from the vertex. For example, for the linked list, A→B→B→C→1 (A), the first B is the intersection point, while the second B is the vertex. The processor may identify the intersection points of the linked list automatically.

In 1108, the processor (e.g., the local geo-fence determination unit 604 of the second grid determination module 412) may determining the one or more local geo-fences based on the updated first linked list and the updated second linked list.

In some embodiments, for determining each of the one or more local geo-fences, the processor may traverse the updated first linked list and the updated second linked list based on a predetermined traverse rule. The processor may determine an intersection set of the border grid and the target geo-fence. The intersection set may include the one or more intersection points of the border grid and the target geo-fence. The processor may determine the local geo-fence based on the intersection set.

In some embodiments, the predetermined traverse rule may be associated with a starting point of the traverse, a traverse sequence or a traverse switching order. The starting point of the traverse may include the vertex of the border grid that is outside of the target geo-fence or the vertex of the target geo-fence that is outside of the border grid. For example, as shown in FIG. 12, the vertex C may be designated as the starting point of the traverse, because the vertex C of the border grid 1202 that is outside of the target geo-fence 1204. As another example, as shown in FIG. 12, the vertex 2, 3, or 4 may be designated as the starting point of the traverse, because these vertexes of the target geo-fence 1204 that is outside of the border grid 1202. The traverse sequence may include a clockwise or a counterclockwise. The traverse switching order may include alternate traversing the updated first linked list and the updated second linked list when encountering an intersection point every time, excluding a first intersection point encountered.

Merely for illustration, the local geo-fence determination unit 604 traverses the updated first linked list 1302 and the updated second linked list 1304 on the predetermined traverse rule. Let the vertex C be as the starting point of the traverse. Firstly, the local geo-fence determination unit 604 traverses the linked list 1302 counterclockwise. The local geo-fence determination unit 604 may encounter a first intersection point N, and put it to the intersection set. The local geo-fence determination unit 604 continues to traverse the updated first linked list 1302 counterclockwise, and encounter a second intersection 1(A). The second intersection 1(A) may be put to the intersection set. Then skip to traverse the linked list 1304 counterclockwise, the local geo-fence determination unit 604 may encounter a third intersection point 1(A). Because the third intersection point is same as the second intersection point, the third intersection point 1(A) may not put to the intersection set repeatedly. Skip to traverse the linked list 1302 counterclockwise, the local geo-fence determination unit 604 may encounter a fourth intersection point 1(A). Because the fourth intersection point is same as the second intersection point, the fourth intersection point 1(A) may not put to the intersection set repeatedly. Skip to traverse the linked list 1304 counterclockwise, the local geo-fence determination unit 604 may encounter a fifth intersection point 1(A). Because the fifth intersection point is same as the second intersection point, the fifth intersection point 1(A) may not put to the intersection set repeatedly. Skip to traverse the updated first linked list 1302 counterclockwise, the local geo-fence determination unit 604 may encounter a sixth point, i.e., the vertex A. Because the sixth point is not the intersection point, the local geo-fence determination unit 604 may continue to traverse the linked list 1302. The local geo-fence determination unit 604 may encounter a seventh intersection point B. The seventh intersection point B may be put to the intersection set. Skip to traverse the linked list 1304, the local geo-fence determination unit 604 may encounter the eighth intersection point B. Because the eighth intersection point is same as the seventh intersection point, the eighth intersection point B may not put to the intersection set repeatedly. Skip to traverse the linked list 1302, the local geo-fence determination unit 604 may encounter the ninth point, i.e., the vertex B. Because the ninth point is not the intersection point, the local geo-fence determination unit 604 may continue to traverse the linked list 1302. The local geo-fence determination unit 604 may encounter the tenth intersection point M, and put the tenth intersection point to the intersection set. Skip to traverse the linked list 1304, the local geo-fence determination unit 604 may encounter the eleventh intersection point N. Because the eleventh intersection point is same as the starting point of the traverse (i.e., the first intersection point N), the local geo-fence determination unit 604 may terminate the traverse. Noted that in the process of the traverse, the traverse may be terminated once the local geo-fence determination unit 604 encounters the starting point of the traverse. Finally, the intersection set may be determined. The intersection set may include the intersection points N, 1A, B and M, that is, {N, 1A, B, M}. A polygonal local geo-fence NABM of the border grid 1302 and the target geo-fence 1304 may be constructed based on the intersection set.

Merely for illustration, FIG. 14 is a schematic diagram illustrating exemplary operate for determine a local-fence according to some embodiments of the present disclosure. The local geo-fence determination unit 604 may number the vertexes of the border grid 1402 and the target geo-fence 1404 respectively, as shown in a of FIG. 14. The local geo-fence determination unit 604 may determine a first linked list that includes the vertexes of the border grid 1402, and determine a second linked list that includes the vertexes of the target geo-fence 1404. As shown in b of FIG. 14, the local geo-fence determination unit 604 may determine the intersection points of the target geo-fence 1402 and the border grid 1404, and number the intersection points. The local geo-fence determination unit 604 may update the first linked list and the second linked list based on the numbered intersection points. Referring to the above traverse process, as shown in c of FIG. 14, the local geo-fence determination unit 604 may determine the local geo-fences of the target geo-fence 1402 and the border grid 1404, that is, the local geo-fences 1406 and 1408.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for determining whether an object belongs to a target geo-fence, comprising:
  at least one storage device including one or more sets of instructions;
  at least one processor in communication with the at least one storage device, wherein when executing the one or more sets of instructions, the at least one processor is directed to:
    obtain geographic coordinates corresponding to a geographic location of the object;
    determine information of a grid corresponding to the geographic coordinates;
    index the grid, based on the information of the grid, in a first grid database;
    in response to a first negative result that the indexed grid is not in the first grid database:
      determine that the object does not belong to the target geo-fence;
    in response to a first positive result that the indexed grid is in the first grid database:
      index the grid, based on the information of the grid, in a second grid database;
      in response to a second negative result that the indexed grid is not in the second grid database:
        determine that the object belongs to the target geo-fence; and
      in response to a second positive result that the indexed grid is in the second grid database:
        determine whether the object belongs to the target geo-fence based on a relationship of the object and a local geo-fence.

2. The system of claim 1, wherein the at least one processor is further directed to establish the first grid database, and
  wherein to establish the first grid database, the at least one processor is further directed to:
    obtain the target geo-fence;
    obtain a plurality of grids corresponding to the target geo-fence, each of the plurality of grids including a polygon having a plurality of vertexes;
    encode data corresponding to the plurality of grids into a first data structure, which includes identifiers of the plurality of grids and coordinates of the plurality of vertexes; and
    write the encoded data in at least one non-transitory storage medium.

3. The system of claim 2, wherein the at least one processor is further directed to establish the second grid database, and
  wherein to establish the second grid database, the at least one processor is further directed to:
    obtain one or more border grids from the plurality of grids;
    determine one or more local geo-fences based on the one or more border grids and the target geo-fence;
    encode data corresponding to the one or more border grids and the one or more local geo-fences into a second data structure, which includes identifiers of the one or more border grids, identifiers of the one or more local geo-fences, coordinates of vertexes of each of the one or more border grids, and coordinates of vertexes of each of the one or more local geo-fences, wherein the vertexes of each of the one or more local geo-fences include one or more intersection points of the border grid and the local geo-fence; and write the encoded data in the at least one non-transitory storage medium.

4. The system of claim 3, wherein to determine one or more local geo-fences based on the one or more border grids and the target geo-fence, the at least one processor is directed to:

for each of the one or more border grids,
determine a first linked list corresponding to the border grid and a second linked list corresponding to the target geo-fence respectively, wherein each node of either the first linked list or the second linked list corresponds to one vertex of the vertexes of the border grid or one vertex of the vertexes of the target geo-fence respectively;
determine the one or more of intersection points of the border grid and the target geo-fence;
update the first linked list and the second linked list based on the one or more intersection points; and
determine the one or more local geo-fences based on the updated first linked list and the updated second linked list.

5. The system of claim 4, wherein to determine the one or more local geo-fences based on the updated first linked list and the updated second linked list, the at least one processor is directed to:

for determining each of the one or more local geo-fences,
traverse the updated first linked list and the updated second linked list based on a predetermined traverse rule;
determine an intersection set of the border grid and the target geo-fence, the intersection set including the one or more intersection points of the border grid and the target geo-fence; and
determine the local geo-fence based on the intersection set.

6. The system of claim 5, wherein the predetermined traverse rule is associated with a starting point of the traverse, and a traverse sequence or a traverse switching order, wherein the starting point of the traverse includes the vertex of the border grid that is outside of the target geo-fence or the vertex of the target geo-fence that is outside of the border grid;
the traverse sequence includes a clockwise or a counter-clockwise; and
the traverse switching order includes alternate traversing the updated first linked list and the updated second linked list every time encountering an intersection point, excluding a first intersection point encountered.

7. The system of claim 4, wherein the first linked list and the second linked list are circular doubly linked lists.

8. The system of claim 1, wherein to determine whether the object belongs to the target geo-fence based on a relationship of the object and a local geo-fence, the at least one processor is further directed to:

determine that the object belongs to the local geo-fence if a ray, whose endpoint is the object, crosses an odd number of borders of the local geo-fence; and determine that the object does not belong to the local geo-fence if the ray, whose endpoint is the object, crosses an even number of borders of the local geo-fence.

9. The system of claim 1, wherein to determine whether the object belongs to the target geo-fence based on a relationship of the object and a local geo-fence, the at least one processor is further directed to:

determine a winding number associated with the object and the local geo-fence;
determine that the object belongs to the local geo-fence if the winding number is unequal to zero; and
determine that the object does not belong to the local geo-fence if the winding number is equal to zero.

10. The system of claim 1, wherein the grid has a shape of a regular hexagon.

11. A method for determining whether an object belongs to a target geo-fence, the method implemented on a computing device having at least one processor and at least one computer-readable storage medium, the method comprising:

obtaining geographic coordinates corresponding to a geographic location of the object;
determining information of a grid corresponding to the geographic coordinates;
indexing the grid, based on the information of the grid, in a first grid database;
in response to a first negative result that the indexed grid is not in the first grid database:
determining that the object does not belong to the target geo-fence;
in response to a first positive result that the indexed grid is in the first grid database:
indexing the grid, based on the information of the grid, in a second grid database;
in response to a second negative result that the indexed grid is not in the second grid database:
determining that the object belongs to the target geo-fence; and
in response to a second positive result that the indexed grid is in the second grid database:
determining whether the object belongs to the target geo-fence based on a relationship of the object and a local geo-fence.

12. The method of claim 11, wherein the method further comprises establishing the first grid database, and wherein the establishing the first grid database further comprises:
obtaining the target geo-fence;
obtaining a plurality of grids corresponding to the target geo-fence, each of the plurality of grids including a polygon having a plurality of vertexes;
encoding data corresponding to the plurality of grids into a first data structure, which includes identifiers of the plurality of grids and coordinates of the plurality of vertexes; and
writing the encoded data in at least one non-transitory storage medium.

13. The method of claim 12, wherein the method further comprises establishing the second grid database, and wherein the establishing the second grid database further comprises:
obtaining one or more border grids from the plurality of grids;
determining one or more local geo-fences based on the one or more border grids and the target geo-fence;
encoding data corresponding to the one or more border grids and the one or more local geo-fences into a second data structure, which includes identifiers of the one or more border grids, identifiers of the one or more local geo-fences, coordinates of vertexes of each of the one or more border grids, and coordinates of vertexes of each of the one or more local geo-fences, wherein the vertexes of each of the one or more local geo-fences include one or more intersection points of the border grid and the local geo-fence; and writing the encoded data in the at least one non-transitory storage medium.

14. The method of claim 13, wherein the determining one or more local geo-fences based on the one or more border grids and the target geo-fence comprises:
for each of the one or more border grids,
determining a first linked list corresponding to the border grid and a second linked list corresponding to the target geo-fence respectively, wherein each node of either the first linked list or the second linked list corresponds to one vertex of the vertexes of the border grid or one vertex of the vertexes of the target geo-fence respectively;
determining the one or more of intersection points of the border grid and the target geo-fence;
updating the first linked list and the second linked list based on the one or more intersection points; and
determining the one or more local geo-fences based on the updated first linked list and the updated second linked list.

15. The method of claim 14, wherein the determining the one or more local geo-fences based on the updated first linked list and the updated second linked list comprises:
for determining each of the one or more local geo-fences,
traversing the updated first linked list and the updated second linked list based on a predetermined traverse rule;
determining an intersection set of the border grid and the target geo-fence, the intersection set including the one or more intersection points of the border grid and the target geo-fence; and
determining the local geo-fence based on the intersection set.

16. The method of claim 15, wherein the predetermined traverse rule is associated with a starting point of the traverse, and a traverse sequence or a traverse switching order,
wherein the starting point of the traverse includes the vertex of the border grid that is outside of the target geo-fence or the vertex of the target geo-fence that is outside of the border grid;
the traverse sequence includes a clockwise or a counter-clockwise; and
the traverse switching order includes alternate traversing the updated first linked list and the updated second linked list every time encountering an intersection point, excluding a first intersection point encountered.

17. The method of claim 14, wherein the first linked list and the second linked list are circular doubly linked lists.

18. The method of claim 11, wherein the determining whether the object belongs to the target geo-fence based on a relationship of the object and a local geo-fence further comprises:
determining that the object belongs to the local geo-fence if a ray, whose endpoint is the object, crosses an odd number of borders of the local geo-fence; and
determining that the object does not belong to the local geo-fence if the ray, whose endpoint is the object, crosses an even number of borders of the local geo-fence.

19. The method of claim 11, wherein the determining whether the object belongs to the target geo-fence based on a relationship of the object and a local geo-fence further comprises:
determining a winding number associated with the object and the local geo-fence;
determining that the object belongs to the local geo-fence if the winding number is unequal to zero; and
determining that the object does not belong to the local geo-fence if the winding number is equal to zero.

20. A non-transitory computer readable medium, comprising at least one set of instructions for determining whether an object belongs to a target geo-fence, wherein when executed by at least one processor of a computing device, the at least one set of instructions causes the computing device to perform a method, the method comprising:
obtaining geographic coordinates corresponding to a geographic location of the object;
determining information of a grid corresponding to the geographic coordinates;
indexing the grid, based on the information of the grid, in a first grid database;
in response to a first negative result that the indexed grid is not in the first grid database:
determining that the object does not belong to the target geo-fence;
in response to a first positive result that the indexed grid is in the first grid database:
indexing the grid, based on the information of the grid, in a second grid database;
in response to a second negative result that the indexed grid is not in the second grid database:
determining that the object belongs to the target geo-fence; and
in response to a second positive result that the indexed grid is in the second grid database:
determining whether the object belongs to the target geo-fence based on a relationship of the object and a local geo-fence, wherein the local geo-fence is a region that a border grid overlaps with the target geo-fence.

* * * * *